(12) United States Patent
Ohashi et al.

(10) Patent No.: US 6,443,025 B2
(45) Date of Patent: Sep. 3, 2002

(54) SHIFT CONTROL SYSTEM FOR VEHICULAR AUTOMATIC TRANSMISSION

(75) Inventors: Tatsuyuki Ohashi; Koichiro Inukai; Satoru Sunada; Yasushi Okawa; Takamichi Shimada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/797,854

(22) Filed: Mar. 5, 2001

(30) Foreign Application Priority Data

Mar. 7, 2000 (JP) ........................................ 2000-062562

(51) Int. Cl.$^7$ ............................ B60K 20/00; G05G 9/00
(52) U.S. Cl. ...................................... 74/473.18; 74/335
(58) Field of Search ............................... 74/473.18, 335

(56) References Cited

U.S. PATENT DOCUMENTS

| | | | |
|---|---|---|---|
| 5,127,288 A | * 7/1992 | Hojo et al. ............... | 701/52 |
| 5,584,209 A | * 12/1996 | Issa .......................... | 200/61.88 |
| 5,767,769 A | * 6/1998 | Issa .......................... | 340/456 |
| 5,845,535 A | * 12/1998 | Wakabayashi et al. ... | 200/61.88 |
| 5,884,529 A | * 3/1999 | Meyer ...................... | 74/473.18 |
| 5,927,150 A | * 7/1999 | Hirano et al. ............. | 74/473.18 |
| 6,089,118 A | * 7/2000 | Ishii et al. ................ | 200/61.88 |
| 6,192,770 B1 | * 2/2001 | Miyoshi et al. ........... | 74/473.15 |
| 6,199,003 B1 | * 3/2001 | Hollingsworth et al. .. | 701/52 |
| 6,209,410 B1 | * 4/2001 | Suzuki ...................... | 74/473.18 |
| 6,223,112 B1 | * 4/2001 | Nishino ..................... | 477/125 |
| 6,230,579 B1 | * 5/2001 | Reasoner et al. .......... | 74/473.18 |
| 6,237,435 B1 | * 5/2001 | Gronhage et al. ......... | 74/471 XY |
| 6,325,196 B1 | * 12/2001 | Beattie et al. ............. | 192/220.4 |
| 2001/0004850 A1 | * 6/2001 | Kim ......................... | 74/473.12 |

FOREIGN PATENT DOCUMENTS

JP 6-221417 8/1994

* cited by examiner

*Primary Examiner*—Christopher P. Schwartz
*Assistant Examiner*—Devon Kramer
(74) *Attorney, Agent, or Firm*—Arent Fox Kintner Plotkin & Kahn, PLLC

(57) ABSTRACT

A shift control system is arranged such that a shift lever 201 is movable to a "P" position, an "R" position, an "N" position, a "D5" position and a "D4" position along a first shift guide path 211, it is movable also from the "D4" position to a "3/M" position along a connection shift guide path 212, and it is movable also along a second shift guide path 213, from the "3/M" position into a direction different from that of the connection shift guide path 212. When the shift lever is shifted to the "D5" position, the transmission is set into an automatic shift control with forward drive speed ratios up to the FIFTH speed ratio. When the shift lever is shifted to the "D4" position, the transmission is set into an automatic shift control with forward drive speed ratios up to the FOURTH speed ratio. When the shift lever is shifted from the "D4" position to the "3/M" position along the connection shift guide path 212, the transmission is set into a "3" range, where an automatic shift control is executed with forward drive speed ratios up to the THIRD speed ratio. Then, the shift lever at the "3/M" position is swiveled along the second shift guide path 213 to shift the speed ratio of the transmission manually in steps.

12 Claims, 17 Drawing Sheets

Fig. 15

| Lever position | | Function |
|---|---|---|
| P position | | Parking |
| R position | | Reverse |
| N position | | Neutral |
| D5 position | | 1-2-3-4-5<br>Automatic shift control |
| D4 position | | 1-2-3-4<br>Automatic shift control |
| 3/M position | | 3 range set upon D4→3/M<br>Automatic shift control |
| | M range | First + or - operation triggers 3→M range shift. Thereafter, + or - operation triggers the following shift. |
| | + operation | Each operation triggers a shift by one step, 1→5 |
| | - operation | Each operation triggers a shift by one step, 5→1 |

*Fig. 17*

| Lever position | Function |
|---|---|
| P position | Parking |
| R position | Reverse |
| N position | Neutral |
| D5 position | 1-2-3-4-5 Automatic shift control |
| S5 position | 1-2-3-4-5 Automatic shift control (sporty mode) |
| S4/M position | S5→S4/M triggers a shift to S4 range. Than, automatic shift control, 1-2-3-4. |
|    M range | First + or - operation triggers S4→M range shift. Thereafter, + or - operation triggers the following shift |
|    + operation | Each operation triggers a shift by one step, 1→5 |
|    - operation | Each operation triggers a shift by one step, 5→1 |

SHIFT CONTROL SYSTEM FOR VEHICULAR AUTOMATIC TRANSMISSION

FIELD OF THE INVENTION

The present invention relates to a shift control system used for a vehicular automatic transmission comprising a shift lever, which is manipulated by a driver.

BACKGROUND OF THE INVENTION

A vehicular automatic transmission is designed to perform automatic speed control for a vehicle on the basis of the following conditions: the position of the shift lever, which is manipulated by the driver at the driver's seat of the vehicle; the movement of the accelerator pedal being stepped down by the driver in relation with the respective drive range determined by the position of the shift lever; the speed of the vehicle, etc. The drive ranges which can be selected by the manipulation of the shift lever are, for example, a parking range (P range), a reverse drive range (R range), a neutral range (N range), and a forward drive range (e.g., D range, etc.), and in many cases, the forward drive range comprises, for example, "D5" range, "D4" range, "3" range, "2" range and "1" range. For the selection of these ranges, generally, the shift lever is swiveled in a plane so that the shift lever is shifted to appropriate positions predetermined for establishing the respective drive ranges. In this case, a shift guide path is provided linearly in a form of slot at the driver's seat, and the shift lever, which extends through the shift guide path, is manipulated along the guide path by the driver for the selection of the drive ranges.

On the basis of this design, shift control systems have been proposed and designed in variation not only to enable the shift lever to swivel linearly along a linear shift guide path but also to allow various patterns of shift manipulation through appropriate arrangement of shift guide paths. For example, Japanese Laid-Open Patent Publication No. H2(1990)-8545 discloses a shift control system with two shift guide paths: a linear first shift guide path (or first shift path) and a second shift guide path provided parallel with this first shift guide path. The manipulation of the shift lever along the first shift guide path enables the selection of the following drive ranges: "P", "R", "N", "D", "3", "2" and "1". In this system, when the shift lever is at the position for the D range, it can be moved into the second shift guide path. Then, in the second shift guide path, the shift lever is manipulated for exclusive selection of the D, 3, 2 and 1 ranges.

Also, Japanese Laid-Open Patent Publication No. H6(1994)-221417 discloses a shift control system which allows the shift lever to be manipulated not only linearly in a shift guide path for the positions of "P", "R", "N", "D" and "B" ranges but also perpendicularly to this shift guide path when the shift lever is at the B range position, for a manual upshift and a manual downshift in steps. Furthermore, this patent publication discloses a shift control system in which the shift lever is manipulated along a linear first shift guide path to positions for "P", "", "N", "D", "M" and "L" ranges, respectively, and is movable laterally at the position for the "M" range into a second shift guide path, where the shift lever is manipulated for a manual upshift and a manual downshift in steps.

In general, the positions of the shift lever of a shift control system for an automatic transmission are predetermined for establishing, for example, "P", "R", "D5", "D3", "3", "2" and "1" ranges, respectively, and additionally to satisfy demand for a manual shift operation, the system is usually designed to allow manual selection of speed ratios. On this background, a various shift control systems have been proposed and produced to make the operation of the shift lever for selecting a desired speed ratio as simple as possible or to make the number of actions taken for shifting the shift lever in selecting a desired speed ratio as small as possible. For example, for an automatic transmission with five forward drive speed ratios, it is desired that a shift control system be designed to enable a manual downshift in which the vehicle driving at the FIFTH speed ratio or at the FOURTH speed ratio is downshifted to the THIRD speed ratio by a smallest number of actions taken for the operation of the shift lever.

SUMMARY OF THE INVENTION

It is an object of the present invention to provide a shift control system for a vehicular automatic transmission, which system simplifies the operation of the shift lever required for changing drive ranges and minimizes the number of actions taken for the operation of the shift lever in shifting the speed ratios of the transmission manually to a desired speed ratio.

In order to achieve this objective, the present invention provides a shift control system for a vehicular automatic transmission, which system comprises at least a first shift guide path, a connection shift guide path and a second shift guide path. The first shift guide path guides a shift lever, which is manipulated by a driver, between a first automatic shift control position and a second automatic shift control position. The connection shift guide path extends in a direction different from that of the first shift guide path and guides the shift lever from the second automatic shift control position to a manual shift control position, and the second shift guide path guides the shift lever which has been positioned at the manual shift control position, into a direction different from that of the connection shift guide path. In this arrangement, the position of the shift lever triggers a change in the operation of the transmission in the following way. When the shift lever is shifted to the first automatic shift control position, the transmission is set into an automatic shift control with forward drive speed ratios up to a highest speed ratio (for example, if the transmission has five forward drive speed ratios, then the highest speed ratio is the FIFTH speed ratio, or if the transmission has four forward drive speed ratios, then the highest speed ratio is the FOURTH speed ratio). When the shift lever is shifted to the second automatic shift control position, the transmission is set into an automatic shift control with forward drive speed ratios up to a second highest speed ratio which is lower than the highest speed ratio (for example, for the five speed ratio transmission, this second highest speed ratio is the FOURTH speed ratio, and for the four speed ratio transmission, it is the THIRD speed ratio). When the shift lever is shifted along the connection shift guide path from the second automatic shift control position to the manual shift control position, the transmission is shifted to a speed ratio lower than a speed ratio that has been in effect prior to this shifting of the shift lever. Then, every time the shift lever at the manual shift control position is swiveled along the second shift guide path, the transmission is shifted to a speed ratio next in order in the forward drive speed ratios.

With this shift control system, for example, when the shift lever is at the first automatic shift control position, the transmission is operated in an automatic shift control with all the forward drive speed ratios including the highest speed ratio. In this condition, if the shift lever is shifted to the second automatic shift control position along the first shift guide path while the vehicle is driving at the highest speed ratio, then the transmission is downshifted to the second highest speed ratio, causing an action of engine brake. If the shift lever is shifted further from the second automatic shift control position to the manual shift control position along the connection shift guide path while the vehicle is driving at the second highest speed ratio, then the transmission is downshifted to an even lower speed ratio, increasing the force of the engine brake. In this way, every time the shift lever is operated appropriately, the shift control system changes the drive range of the transmission to effect a downshift. Even when the shift lever is shifted along the connection shift guide path, the shift control system effects a change in the drive range. Therefore, in this system, the number of actions taken by the driver for the shift manipulation is relatively small, so the shift control system according to the present invention offers a superior operativity.

Furthermore, in the shift control system according to the present invention, the shift lever at the manual shift control position is swiveled along the second shift guide path for a speed ratio change, i.e., a manual control of speed ratio change. Therefore, the shift control system offers a good operativity not only for switching the drive ranges but also for selecting an appropriate speed ratio manually.

The above mentioned second highest speed ratio is predetermined as a speed ratio which is one step immediately lower than the highest speed ratio, and the shift control system can be arranged to function in the following way. When the shift lever is shifted from the second automatic shift control position to the manual shift control position, the transmission is shifted to a speed ratio which is lower than a speed ratio that has been in effect prior to this shifting of the shift lever. Thereafter, as long as the shift lever is not operated, the transmission is operated in an automatic shift control with forward drive speed ratios up to a third highest speed ratio which is one step lower than the second highest speed ratio (for example, for the five speed ratio transmission, this third highest speed ratio is the THIRD speed ratio, and for the four speed ratio transmission, it is the SECOND speed ratio). Alternatively, the shift control system may be arranged to function in the following way. When the shift lever is shifted from the second automatic shift control position to the manual shift control position, the transmission is shifted to a speed ratio which is lower than a speed ratio that has been in effect prior to this shifting of the shift lever. Thereafter, the transmission is kept at this newly set speed ratio as long as the shift lever is not operated.

In this shift control system, when the shift lever is shifted from the first automatic shift control position through the second automatic shift control position to the manual shift control position while the vehicle is driving at the highest speed ratio, the transmission is downshifted in steps, one step from the highest speed ratio to the second highest speed ratio, and another step from the second highest speed ratio to the third highest speed ratio.

Another embodiment of shift control system according to the present invention also comprises a first shift guide path, a connection shift guide path and a second shift guide path. The first shift guide path guides a shift lever, which is manipulated by a driver, between a first automatic shift control position and a second automatic shift control position. The connection shift guide path extends in a direction different from that of the first shift guide path and guides the shift lever from the second automatic shift control position to a manual shift control position, and the second shift guide path guides the shift lever which has been positioned at the manual shift control position, into a direction different from that of the connection shift guide path. However, in this case, the shift control system is arranged to function in the following way. When the shift lever is either at the first automatic shift control position or at the second automatic shift control position, the transmission is operated in an automatic shift control which is executed with forward drive speed ratios up to the highest speed ratio. Yet, the automatic shift control for the second automatic shift control position is executed in accordance with speed ratio shift lines which are mapped more toward higher speeds than those mapped for the automatic shift control that is executed for the first automatic shift control position. In this arrangement, when the shift lever is shifted from the second automatic shift control position to the manual shift control position along the connection shift guide path, the transmission is shifted to a speed ratio which is lower than a speed ratio that has been in effect prior to this shifting of the shift lever. Then, the shift lever at the manual shift control position is swiveled along the second shift guide path to shift the speed ratios of the transmission, step by step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention and wherein:

FIG. 15 is a table describing a shift control function for each position of the shift lever.

FIG. 17 is a table describing a shift control function for each position of the shift lever manipulated in the unit shown in FIG. 16.

DESCRIPTION OF THE PREFERRED EMBODIMENTS

Figure 1:
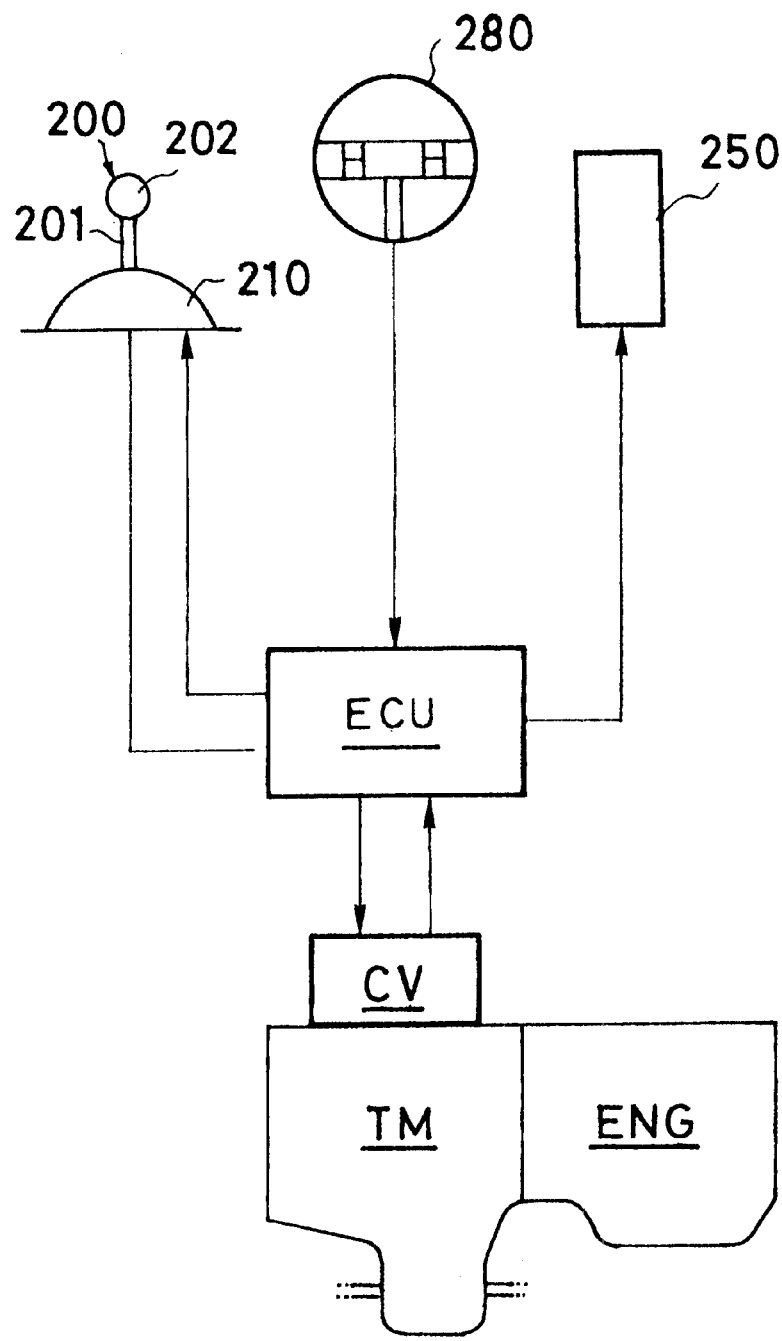
FIG. 1 is a schematic block diagram showing the whole construction of a shift control system according to the present invention and an automatic transmission, which is controlled by the shift control system.

In reference to the drawings, a shift control system according to the present invention and a vehicular automatic transmission, whose drive ranges are selected and established by the shift control system, will be described in the following. FIG. 1 shows the whole construction of the power transmission mechanism, including the shift control system. This power transmission mechanism comprises an engine ENG, an automatic transmission TM, which transmits the output of the engine to wheels with a speed change. This speed change through the automatic transmission TM is controlled hydraulically by a shift control valve CV, whose operation is determined by solenoid valves, which are, in turn, controlled with shift control signals by an electronic control unit ECU. The electronic control unit ECU is connected with a shift manipulation unit 200, a shift manipulation switching unit 280, which is provided on the steering wheel, and a shift indicator unit 250, which is provided in an instrument panel.

At first, the construction of the automatic transmission TM is described in reference to FIGS. 2~5. In a transmission housing HSG, this transmission comprises a torque converter TC, which is connected to the output shaft of an engine (not shown), a parallel shaft speed change mechanism TM, which is connected to the output member (or turbine) of the torque converter TC, and a differential mechanism DF including a last reduction driven gear 6b, which meshes with a last reduction drive gear 6a provided in the speed change mechanism TM. The drive power for the vehicle is transmitted through the differential mechanism DF to lateral wheels.

Figure 4A:
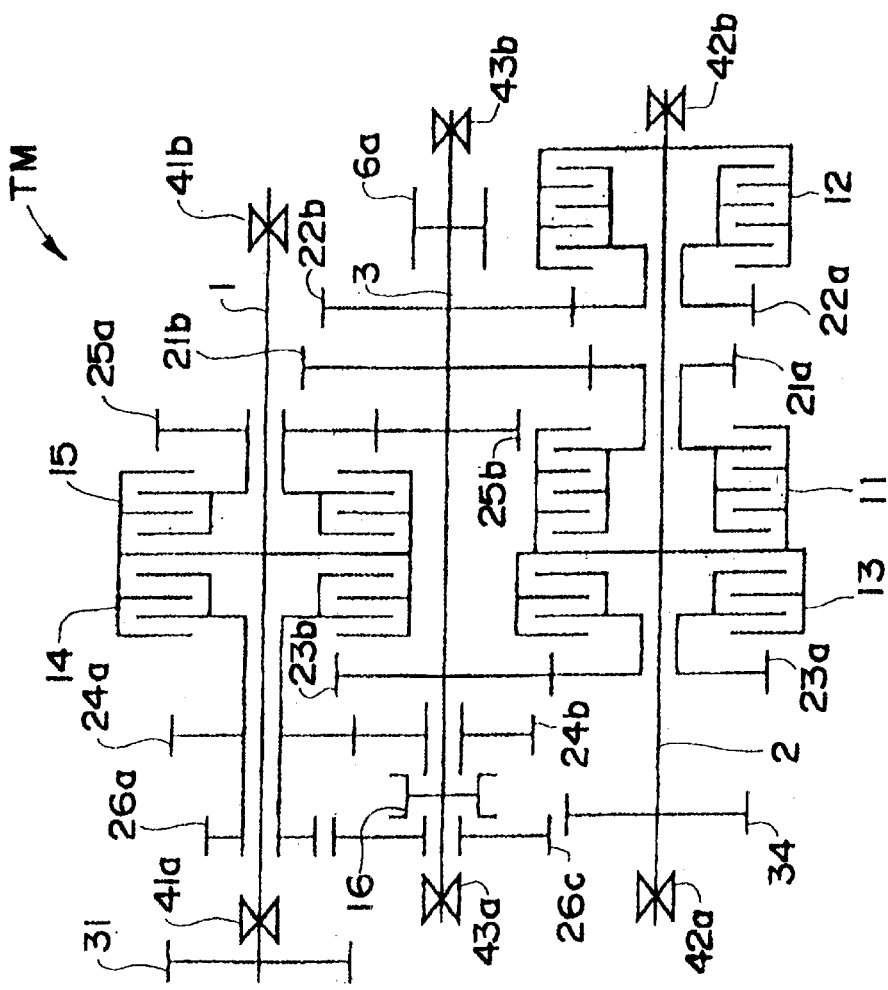
FIG. 4 is a skeleton diagram which shows schematically the power transmission system of the automatic transmission.
Figure 4B:
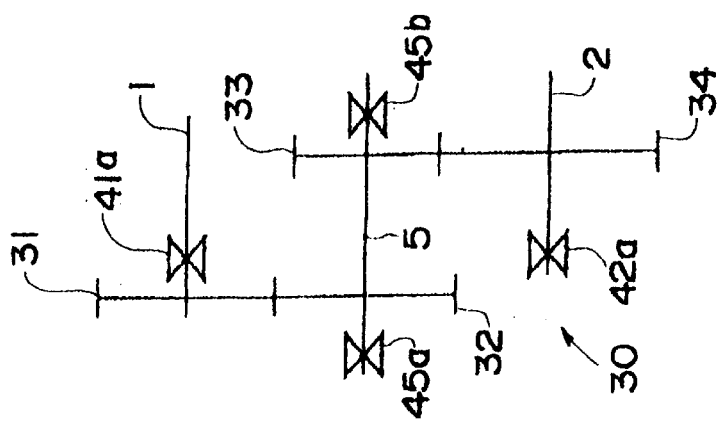
Figure 5:
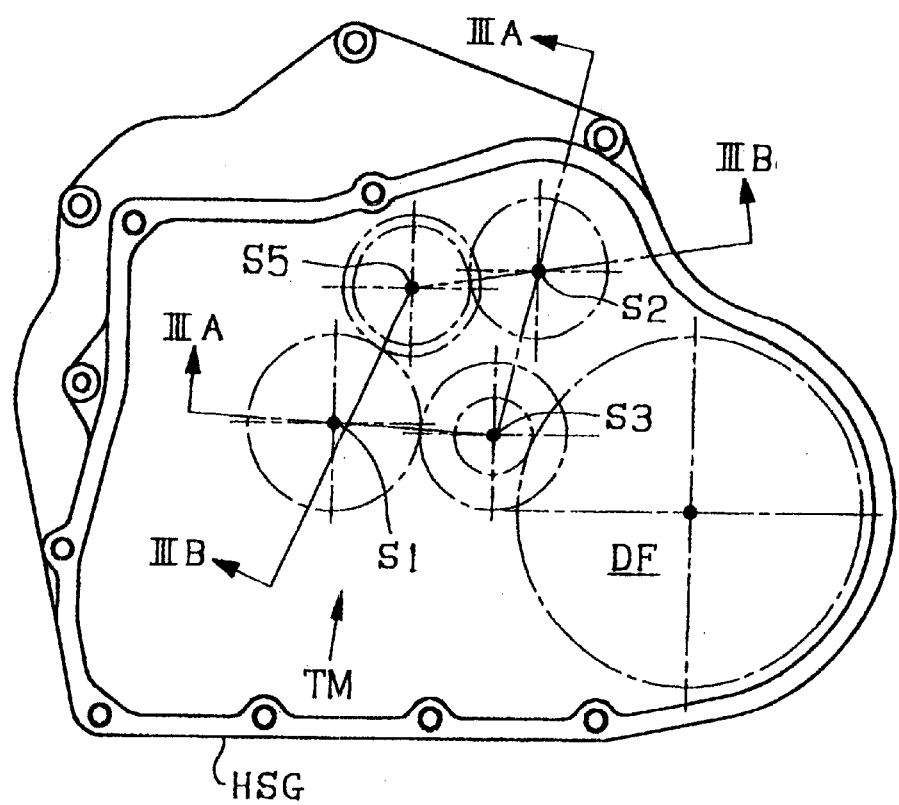
FIG. 5 is a schematic diagram showing the relative positions of the shafts of the automatic transmission.

The parallel shaft speed change mechanism TM includes a first input shaft 1, a second input shaft 2, a countershaft 3, and an idle shaft 5, all of which are disposed parallel with one another. FIG. 5 shows the positions of these shafts in the housing, the centers of the shafts being indicated by corresponding alphanumeric marks, S1, S2, S3 and S5. FIGS. 4A and 4B show the rotational components of the speed change mechanism TM, which are arranged for mechanical power transmission. FIG. 4A is a schematic sectional view showing the first input shaft 1 (S1), the second input shaft 2 (S2) and the countershaft 3 (S3), which are taken along line IIIA—IIIA in FIG. 5, while FIG. 4B is a schematic sectional view showing the first input shaft 1 (S1), the second input shaft 2 (S2) and the idle shaft 5 (S5), which are taken along line IIIB—IIIB in FIG. 5. Furthermore, FIG. 2 corresponds with FIG. 4A while FIG. 3 corresponds with FIG. 4B, all of which are sectional views of the speed change mechanism TM.

The first input shaft 1 is connected directly to the turbine of the torque converter TC and is supported rotatably by bearings 41a and 41b. The first input shaft 1 receives the drive power from the turbine and rotates with it at the same rotational speed. On this input shaft 1, from the side of the torque converter TC (i.e., the right side of the drawing), disposed are a FIFTH speed drive gear 25a, a FIFTH speed clutch 15, a FOURTH speed clutch 14, a FOURTH speed drive gear 24a, a reverse drive gear 26a, and a first connection gear 31. The FIFTH speed drive gear 25a is disposed rotatably on the first input shaft 1, and the FIFTH speed clutch 15, which is actuated hydraulically, engages with the FIFTH speed drive gear 25a to connect it rotationally to the first input shaft 1. The FOURTH speed drive gear 24a and the reverse drive gear 26a, which are coupled as one body, are disposed rotatably on the first input shaft 1, and the FOURTH speed clutch 14, which is actuated hydraulically, engages with these gears to connect them rotationally to the first input shaft 1. The first connection gear 31 is mounted on the first input shaft 1, at the left end thereof outside the bearing 41a, which supports the first input shaft 1 rotatably. In this condition, the first connection gear 31 and this end portion of the first input shaft 1 are supported only by this bearing 41a in cantilever.

The second input shaft 2 is also supported rotatably by bearings 42a and 42b. On this input shaft 2, from the right side of the drawing, disposed are a SECOND speed clutch 12, a SECOND speed drive gear 22a, a LOW drive gear 21a, a LOW clutch 11, a THIRD speed clutch 13, a THIRD speed drive gear 23a, and a fourth connection gear 34. The SECOND speed drive gear 22a, the LOW drive gear 21a and the THIRD speed drive gear 23a are each disposed rotatably on the second input shaft 2, and the SECOND speed clutch 12, the LOW clutch 11, or the THIRD speed clutch 13, which is actuated hydraulically, engages with the respective gear to connect it rotationally to the second input shaft 2. In addition, the fourth connection gear 34 is coupled to the second input shaft 2.

The idle shaft 5 including a second connection gear 32 and a third connection gear 33, which are formed as one body with the idle shaft 5, is supported rotatably by bearings 45a and 45b. The second connection gear 32 meshes with the first connection gear 31 while the third connection gear 33 meshes with the fourth connection gear 34. The first, second, third and fourth connection gears constitute a connection gear train 30, through which the rotation of the first input shaft 1 is transmitted continually to the second input shaft 2.

The countershaft 3 is supported rotatably by bearings 43a and 43b. On this shaft 3, from the right side of the drawing, disposed are the above mentioned last reduction drive gear 6a, a SECOND speed driven gear 22b, a LOW driven gear 21b, a FIFTH speed driven gear 25b, a THIRD speed driven gear 23b, a FOURTH speed driven gear 24b, a dog clutch 16, and a reverse driven gear 26c. The last reduction drive gear 6a, the SECOND speed driven gear 22b, the LOW driven gear 21b, the FIFTH speed driven gear 25b and the THIRD speed driven gear 23b are fixed on and rotate together with the countershaft 3 while the FOURTH speed driven gear 24b and the reverse driven gear 26c are each disposed rotatably on the countershaft 3. The dog clutch 16 is actuated axially in one direction to engage with the FOURTH speed driven gear 24b so as to connect it rotationally to the countershaft 3 or in the opposite direction to engage with the reverse driven gear 26c so as to connect it rotationally to the countershaft 3.

As shown in the drawings, the LOW drive gear 21a meshes with the LOW driven gear 21b; the SECOND speed drive gear 22a meshes with the SECOND speed driven gear 22b; the THIRD speed drive gear 23a meshes with the THIRD speed driven gear 23b; the FOURTH speed drive gear 24a meshes with the FOURTH speed driven gear 24b; and the FIFTH speed drive gear 25a meshes with the FIFTH speed driven gear 25b. In addition, the reverse drive gear 26a meshes with a reverse idler gear 26b (refer to FIG. 3), which then meshes with the reverse driven gear 26c.

Figure 2:
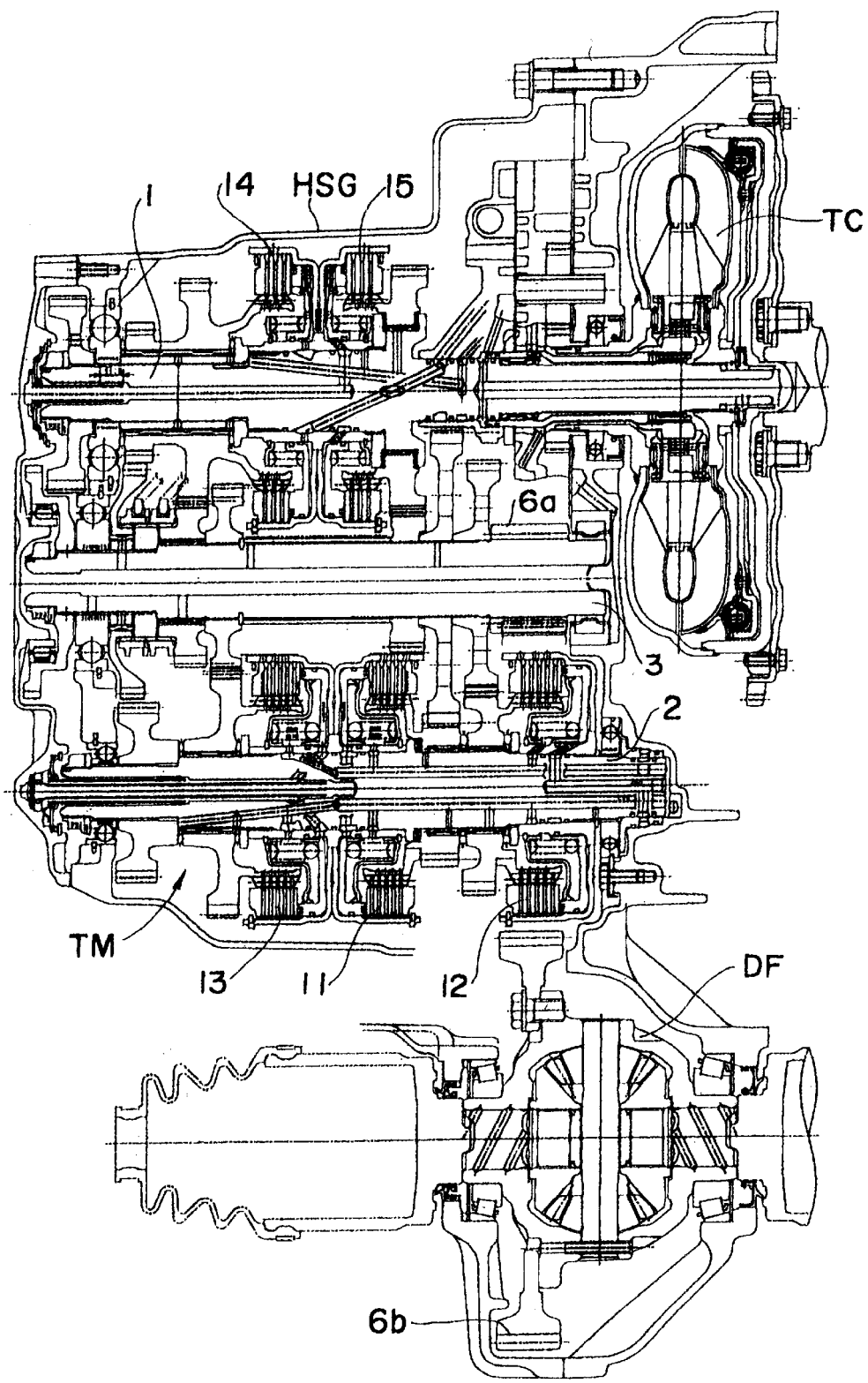
FIG. 2 is a sectional view of the automatic transmission, whose speed ratio is controlled by the control system according to the present invention.
Figure 3:
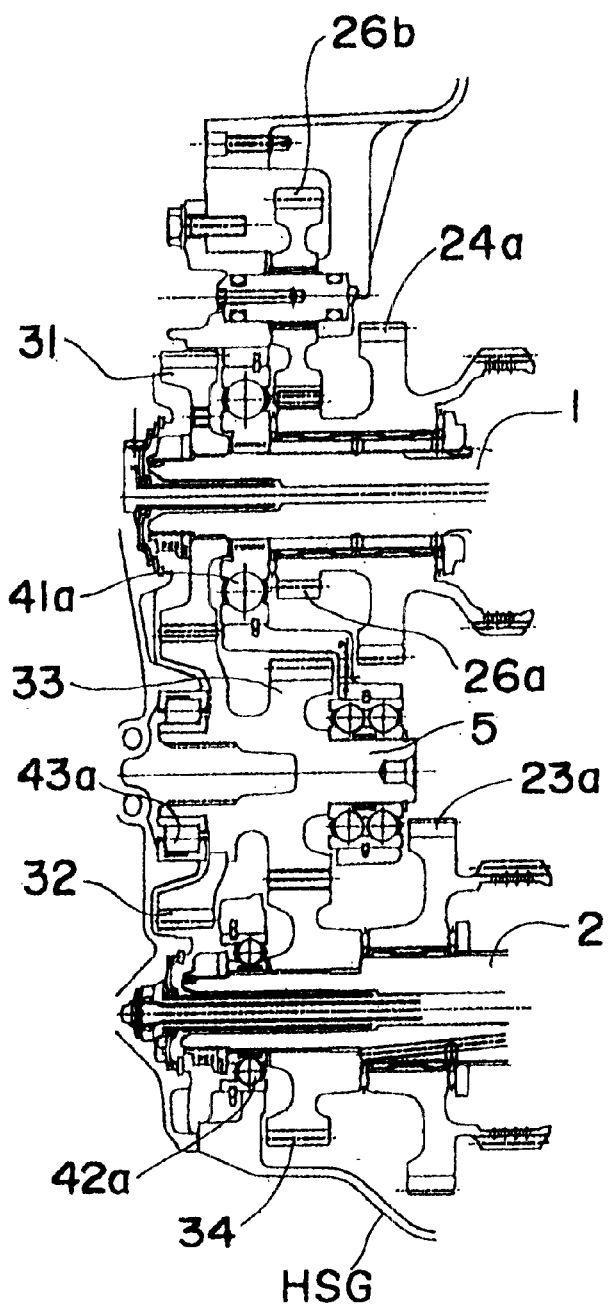
FIG. 3 is a partial sectional view of the automatic transmission.

The last reduction drive gear 6a meshes with the last reduction driven gear 6b (refer to FIG. 2, which shows that they are situated at the same position in the axial direction though the drawing does not show the actual condition that they mesh with each other). The rotation of the countershaft 3 is transmitted through the last reduction drive and driven gears 6a and 6b to the differential mechanism DF.

Now, a description is given of how each speed ratio is established and through which path the drive power is transmitted at each speed ratio. In this transmission, for establishing the forward drive range, the dog clutch 16 is shifted toward the right side of the drawing, where the dog clutch 16 engages with the FOURTH speed driven gear 24b to connect it rotationally to the countershaft 3. For the reverse drive range, the dog clutch 16 is shifted leftward, where the dog clutch 16 engages with the reverse driven gear 26c to connect it rotationally to the countershaft 3.

First, the establishment of each speed ratio of the forward drive range is described. The LOW ratio is established when the LOW clutch 11 is engaged. The rotational drive power which is input from the torque converter TC to the first input shaft 1 is transmitted through the connection gear train 30 to the second input shaft 2. Because the LOW clutch 11 is engaged, the LOW drive gear 21a which is driven at the same rotational speed as the second input shaft 2 drives the LOW driven gear 21b mounted on the countershaft 3. This drive power is then transmitted through the last reduction drive and driven gears 6a and 6b to the differential mechanism DF.

The SECOND speed ratio is established when the SECOND speed clutch 12 is engaged. The rotational drive power which is input from the torque converter TC to the first input shaft 1 is transmitted through the connection gear train 30 to the second input shaft 2. Because the SECOND speed clutch 12 is engaged, the SECOND speed drive gear 22a which is driven at the same rotational speed as the second input shaft 2 drives the SECOND speed driven gear 22b mounted on the countershaft 3. This drive power is then transmitted through the last reduction drive and driven gears 6a and 6b to the differential mechanism DF The THIRD speed ratio is established when the THIRD speed clutch 13 is engaged. The rotational drive power which is input from the torque converter TC to the first input shaft 1 is transmitted through the connection gear train 30 to the second input shaft 2. Because the THIRD speed clutch 13 is engaged, the THIRD speed drive gear 23a which is driven at the same rotational speed as the second input shaft 2 drives the THIRD speed driven gear 23b mounted on the countershaft 3. This drive power is then transmitted through the last reduction drive and driven gears 6a and 6b to the differential mechanism DF.

The FOURTH speed ratio is established when the FOURTH speed clutch 14 is engaged. The rotational drive power which is input from the torque converter TC to the first input shaft 1 is transmitted through the FOURTH speed clutch 14 to the FOURTH speed drive gear 24a, which drives the FOURTH speed driven gear 24b. Because the dog clutch 16 is kept engaged with the FOURTH speed driven gear 24b for the forward drive range, the countershaft 3 is driven. This drive power is then transmitted through the last reduction drive and driven gears 6a and 6b to the differential mechanism DF.

The FIFTH speed ratio is established when the FIFTH speed clutch 15 is engaged. The rotational drive power which is input from the torque converter TC to the first input shaft 1 is transmitted through the FIFTH speed clutch 15 to the FIFTH speed drive gear 25a, which drives the FIFTH speed driven gear 25b. The FIFTH speed driven gear 25b, which is fixed to the countershaft 3, in turn, drives the countershaft 3. This drive power is then transmitted through the last reduction drive and driven gears 6a and 6b to the differential mechanism DF.

The reverse drive range is established when the FOURTH speed clutch 14 is engaged, and the dog clutch 16 is shifted leftward. The rotational drive power which is input from the torque converter TC to the first input shaft 1 is transmitted through the FOURTH speed clutch 14 to the reverse drive gear 26a, which, in turn, drives the reverse driven gear 26c through the reverse idler gear 26b. Because the dog clutch 16 is engaged with the reverse driven gear 26c for the reverse drive range, the countershaft 3 is driven. This drive power is then transmitted through the last reduction drive and driven gears 6a and 6b to the differential mechanism DF. It should be noted that, as described in this paragraph, the FOURTH speed clutch 14 is used as a reverse clutch for the establishment of the reverse drive range in this transmission in addition to the establishment of the above described FOURTH speed ratio.

Now, in reference to FIGS. 6~11, a description is made of a hydraulic circuit constituting the shift control valve CV, which performs a shift control in this automatic transmission. FIGS. 7~11 show five sections of the hydraulic circuit at an enlarged scale, which sections are partitioned by alternate long and short dash lines A~E, respectively, in FIG. 6. The points of the oil passages shown open in the hydraulic circuit diagram are connected to a drainage system.

This hydraulic circuit includes an oil pump OP being driven by the engine to supply working oil from an oil tank OT to an oil passage 100. This oil passage 100 is connected through a branch passage 100a to a main regulator valve 50, where the pressure of the oil in the oil passages 100 and 100a is adjusted to a predetermined line pressure PL. This line pressure PL is then supplied through another branch passage 100b to first ~fifth on/off solenoid valves 81~85 and to a first linear solenoid valve 86.

Surplus oil from the oil used for the generation of the line pressure PL at the main regulator valve 50 is led to an oil passage 101 and then to another oil passage 102. The oil flowing to the passage 101 is regulated by a lock-up shift valve 51, a lock-up control valve 52 and a torque converter check valve 53, and the oil is used for actuating and locking up the torque converter TC. After being used for the control of the torque converter TC, this oil returns through an oil cooler 54 to the oil tank OT. In this description, no explanation is given of the control of the torque converter TC because the control of the torque converter is not related directly to the present invention. The pressure of the oil supplied to the passage 102 is adjusted by a lubrication relief valve 55, and this oil is used for lubricating various parts of the transmission.

Figure 6:
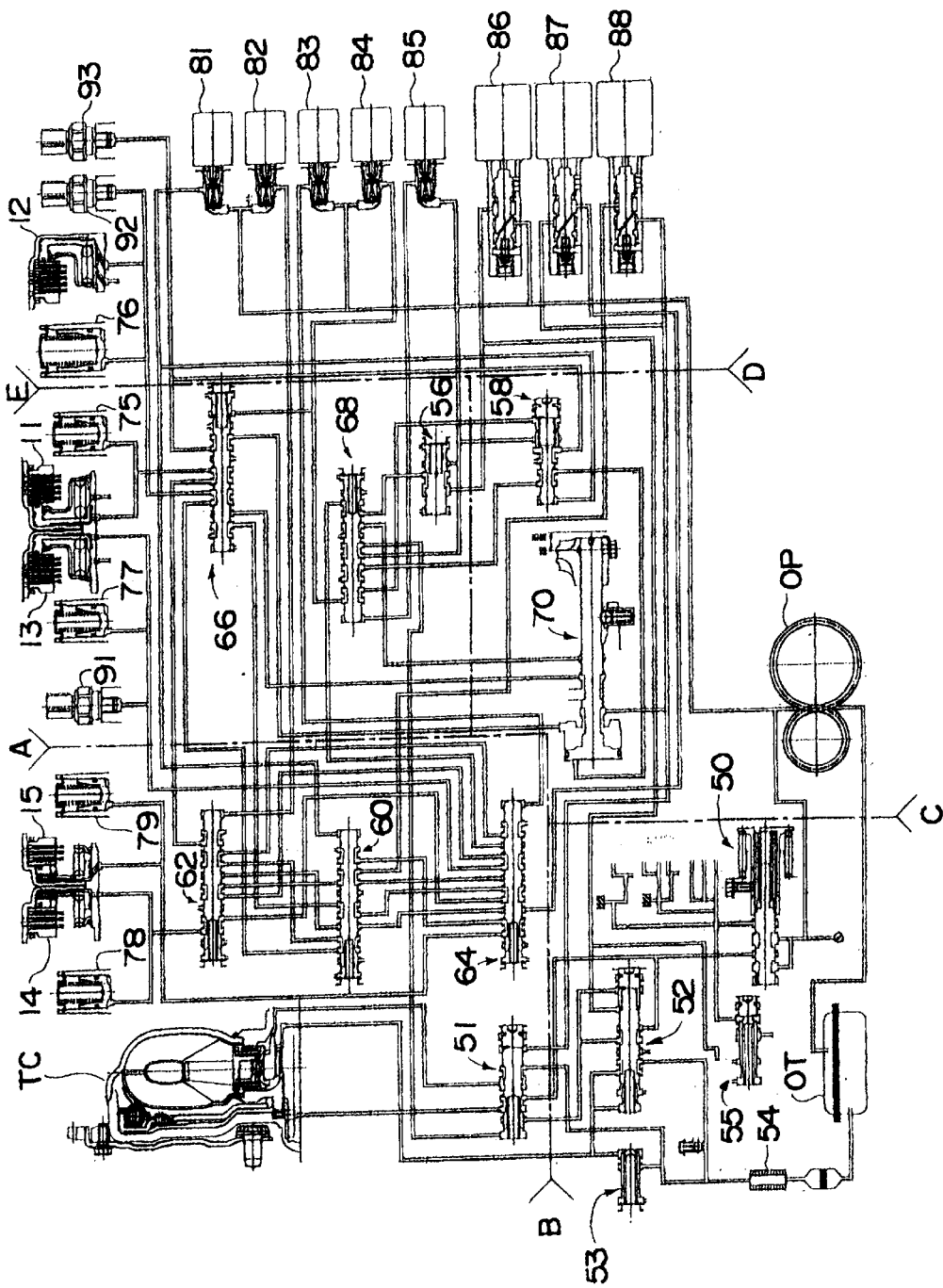
FIG. 6 is a diagram showing a hydraulic circuit which constitutes the control system according to the present invention.
Figure 7:
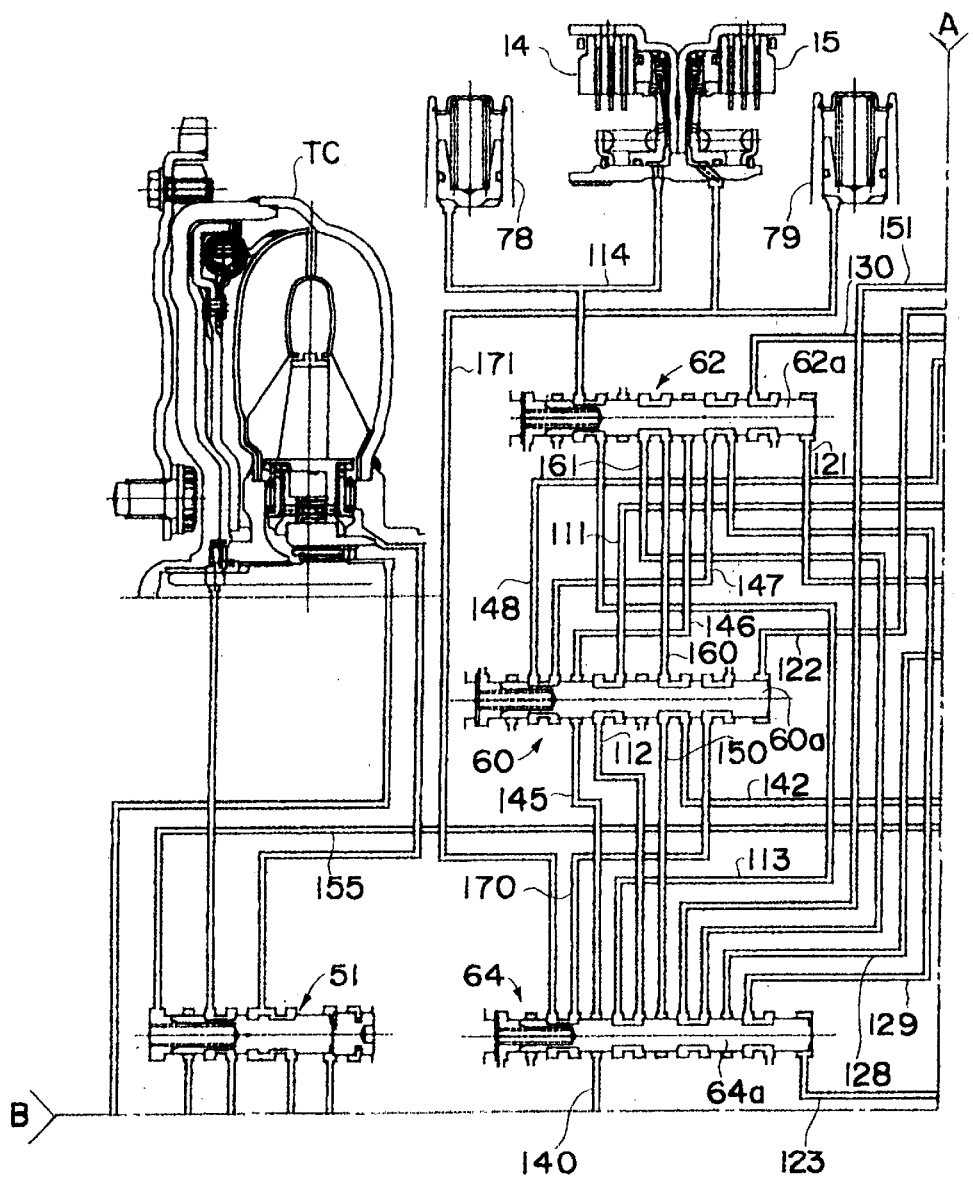
FIGS. 7~11 are diagrams, each showing part of the diagram of FIG. 6, respectively, in enlargement.
Figure 8:
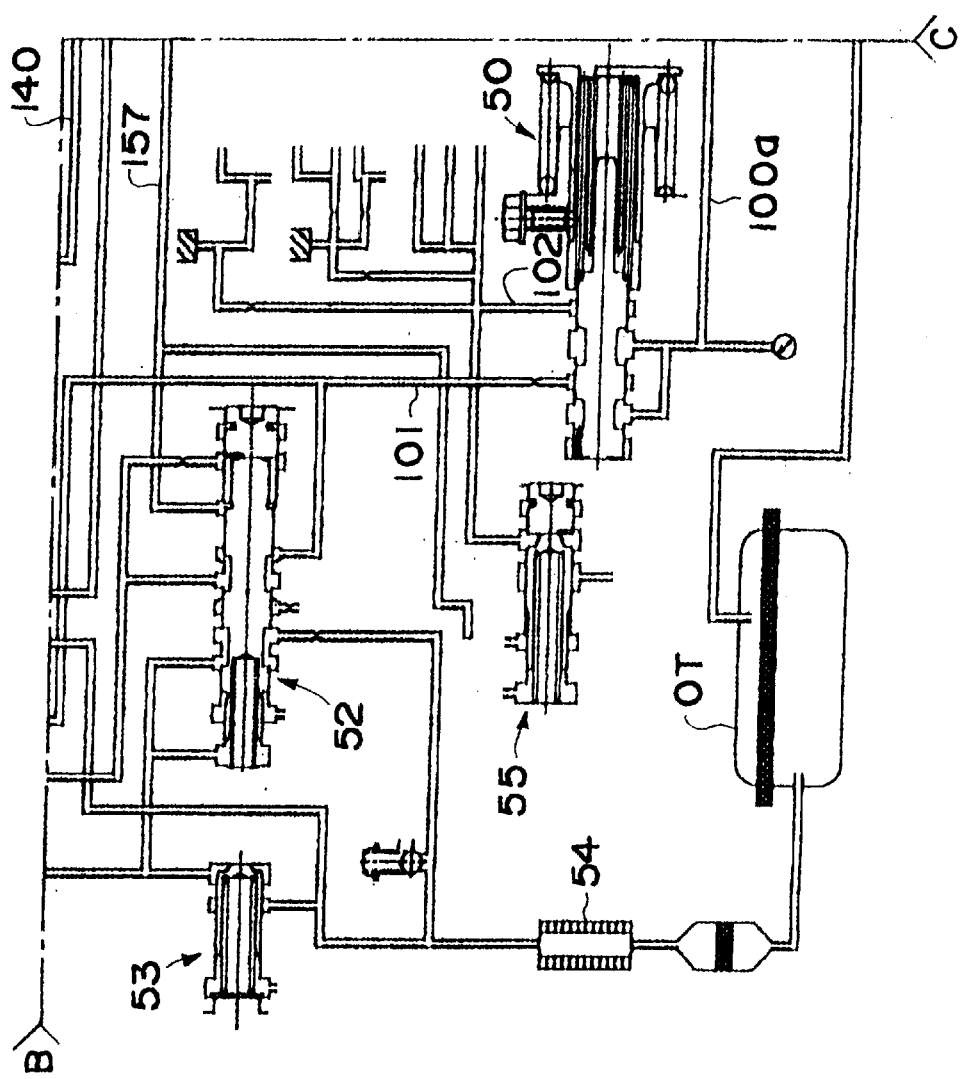
Figure 9:
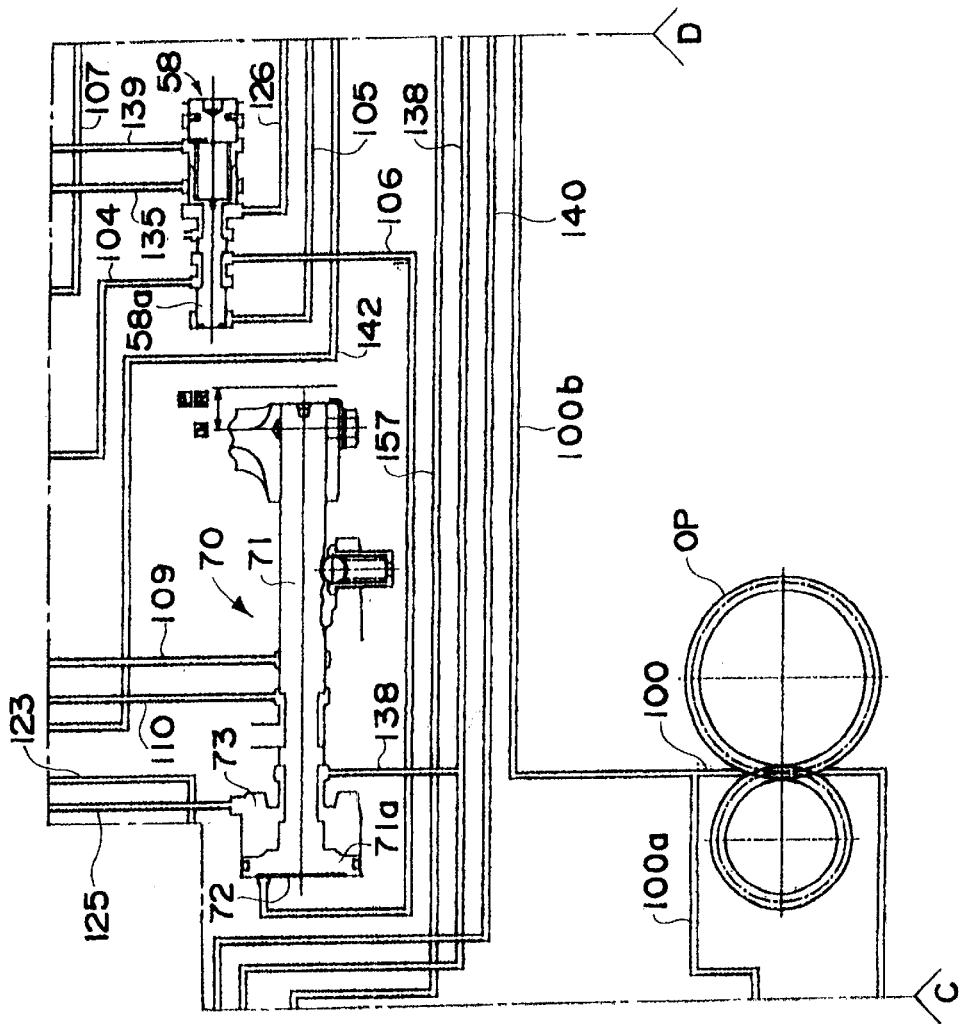
Figure 10:
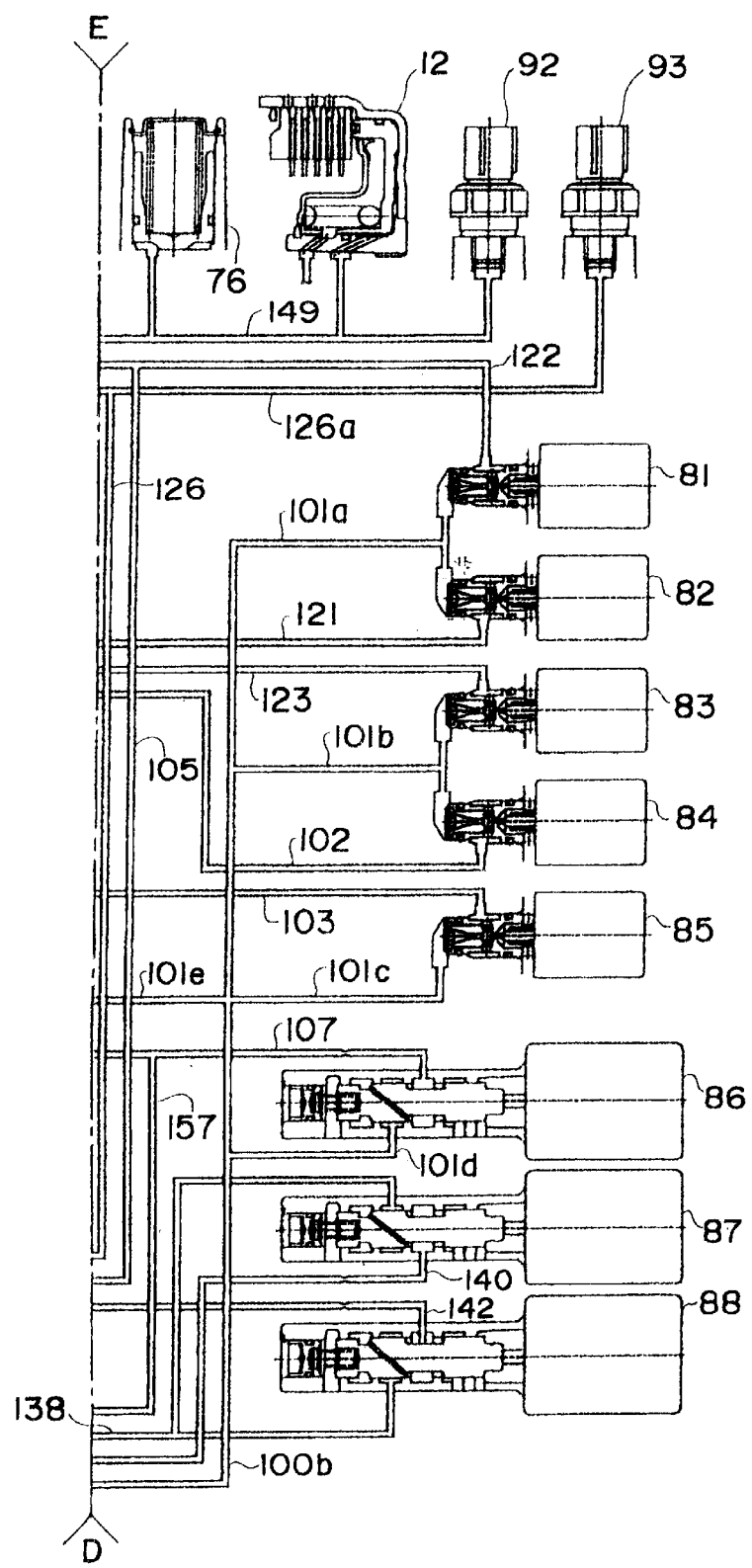
Figure 11:
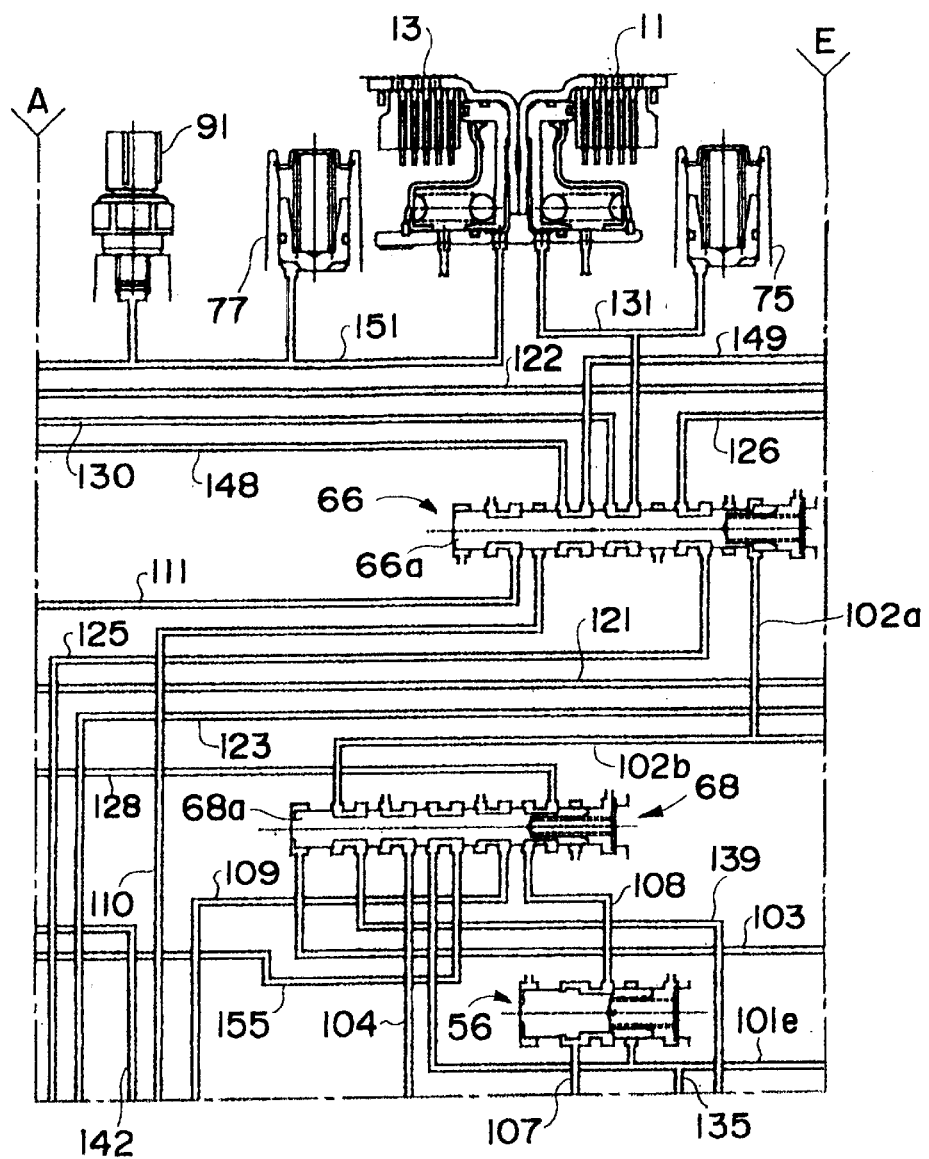

As shown in FIG. 6, a LOW accumulator 75, a SECOND accumulator 76, a THIRD accumulator 77, a FOURTH accumulator 78 and a FIFTH accumulator 79 are connected through oil passages, respectively, to the LOW clutch 11, the SECOND speed clutch 12, the THIRD speed clutch, the FOURTH speed clutch 14 and the FIFTH speed clutch 15, which constitute the automatic transmission as described above. This hydraulic circuit is also equipped with a forward/reverse selection hydraulic servomechanism 70 to operate the dog clutch 16.

Furthermore, as shown in the figure, a first shift valve 60, a second shift valve 62, a third shift valve 64, a fourth shift valve 66, a fifth shift valve 68, a CPB valve 56 and a D inhibitor valve 58 are provided to control the hydraulic pressure supplied to these clutches 11~15 and to the forward/reverse selection hydraulic servomechanism 70. To control the actuation of these valves and to control the hydraulic pressure supplied to the clutches, etc, the above mentioned first~fifth on/off solenoid valves 81~85 and the first~third linear solenoid valves 86~88 are arranged appropriately.

Now, the operation of this hydraulic circuit is described for each speed change ratio, which is established when the condition of the first~fifth on/off solenoid valves 81~85 is set as listed in Table 1 below. The first ~fifth on/off solenoid valves 81~85 are normally closed valves, so each valve opens to generate a signal pressure to actuates other respective valves when its solenoid is electrically energized (i.e., while it is turned ON).

TABLE 1

| | Solenoid valves | | | | | |
|---|---|---|---|---|---|---|
| | 81 | 82 | 83 | 84 | 85 | Mode |
| R | X | X | X | O | O | Reverse |
| N | O | O | O | O | O | First NEUTRAL |
| | O | X | X | O | X | Second NEUTRAL |
| D | O | O | O | O | X | F/S SECOND |
| | X | O | O | X | X | In-gear |
| | O | O | O | X | X | LOW |
| | X | O | O | X | O/X | 1-2-3 |
| | X | O | X | X | O/X | SECOND |
| | X | X | X | X | O/X | THIRD |
| | X | X | O | X | O/X | 2-3-4 |
| | O | X | O | X | O/X | FOURTH |
| | O | X | X | X | O/X | 4-5 |
| | O | O | X | X | O/X | FIFTH |

Note: "O" and "X" in the table represent the turning on and off of the solenoids, respectively.

At first, a description is given for the establishment of the reverse speed ratio. As shown in Table 1, the first~third on/off solenoid valves 81~83 are turned off and are closed while the fourth and fifth on/off solenoid valves 84 and 85 are turned on and are opened. In this condition, the line pressure PL which is supplied to the fourth and fifth on/off solenoid valves 84 and 85 through oil passages 101b and 101c that branch from the oil passage 100b is supplied to oil passages 102 and 103. The line pressure PL in the passage 102 acts on the right end flange portion of the fourth shift valve 66 through an oil passage 102a and shifts the spool 66a of the valve rightward (this action results in a condition opposite to that shown in the figure). The line pressure PL in the passage 103 acts on the left end of the fifth shift valve 68 and shifts the spool 68a of the valve rightward (this results in a condition opposite to that shown in the figure). As a result, an oil passage 102b that is branched from the passage 102 is blocked at the fifth shift valve 68.

On the other hand, the line pressure PL being supplied to the fifth shift valve 68 through an oil passage 101e that is branched from the passage 100b is supplied through a groove provided on the spool 68a of the fifth shift valve 68 to an oil passage 104, which leads to the D inhibitor valve 58. In this condition, because an oil passage 105 connected to the left end of the D inhibitor valve 58 is connected to a drain at the first on/off solenoid valve 81, the spool 58a of the D inhibitor valve 58 is positioned to the left side of the valve, so the passage 104 is connected with a passage 106 which is connected to the left side oil chamber 72 of the forward/reverse selection hydraulic servomechanism 70. Therefore, the line pressure PL being supplied into the left side oil chamber 72 pushes rightward the piston portion 71a of a rod 71 which is provided in the forward/reverse selection hydraulic servomechanism 70. When the rod 71, which is provided with a shift fork to operate the dog clutch 16, is shifted rightward, the dog clutch 16 engages with the reverse driven gear 26c to connect it rotationally to the countershaft 3.

As mentioned previously, the reverse drive range is established when the dog clutch 16 is engaged with the reverse driven gear 26c and the FOURTH speed clutch 14 is engaged. The engagement of the FOURTH speed clutch 14 is actuated by the first linear solenoid valve 86, to which the line pressure PL is supplied through an oil passage 101d. At the first linear solenoid valve 86, the supply of the line pressure to another oil passage 107 is adjusted by means of electrical control of the current flowing through the solenoid of the valve (pressure adjustment control).

This passage 107 is connected with another oil passage 108 through the CPB valve 56, and this oil passage 108 is connected with another oil passage 109 through a passage which is created when the spool 68a of the fifth shift valve 68 is shifted rightward. This oil passage 109 is then connected with another oil passage 110 through a passage which is created by a groove of the rod 71 of the forward/reverse selection hydraulic servomechanism 70 when the rod is shifted rightward. This oil passage 110 is then connected with another oil passage 111 through a passage which is created when the spool 66a of the fourth shift valve 66 is shifted rightward. Then, this oil passage 111 is connected with another oil passage 112 through a passage which is created when the spool 60a of the first shift valve 60 is shifted rightward. This oil passage 112 is then connected with another oil passage 113 through a passage which is created when the spool 64a of the third shift valve 64 is shifted rightward. Furthermore, this oil passage 113 is connected with another oil passage 114 through a passage which is created when the spool 62a of the second shift valve 62 is shifted rightward. This oil passage 114 is then connected to the actuation oil chamber of the FOURTH speed clutch 14 and to the FOURTH accumulator 78. In this arrangement, the engagement of the FOURTH speed clutch 14 is controlled by the first linear solenoid valve 86 for setting the reverse speed ratio.

Now, the control for establishing the neutral range is described. As shown in Table 1, the neutral range comprises first and second neutral modes. The first neutral mode takes place when the neutral range (N range) or the reverse drive range (R range) is selected while the vehicle is driving at a speed greater than a predetermined speed (e.g., 10 km/h) in the forward drive range (D range). The first neutral mode functions as a reverse inhibitor to prevent the transmission from shifting to the reverse speed ratio in such a condition. The second neutral mode takes place when the transmission shifts from the reverse drive range to the neutral range and from the forward drive range to the neutral range. Moreover, when the transmission shifts from the reverse drive range through the second neutral mode to the forward drive range, the transmission goes through the in-gear mode listed in Table 1. On the other hand, if the transmission, after having shifted from the reverse drive range to the second neutral mode, is operated to shift from the second neutral mode to the reverse drive range, the transmission shifts directly to the reverse drive range without going through the in-gear mode.

In the same way, the second neutral mode takes place when the transmission shifts from the forward drive range to the reverse drive range, so the reverse drive range is established after the D inhibitor valve 58 is actuated to a reverse mode. However, if the transmission, after having shifted from the forward drive range to the second neutral mode, is operated to shift from the second neutral mode to the forward drive range, the transmission shifts directly to the forward drive range without any mode change of the D inhibitor valve 58.

In the first neutral mode, all the first–fifth on/off solenoid valves 81–85 are turned on and are open. Therefore, when the mode of the transmission is changing from the reverse speed ratio or reverse drive range to the first neutral mode, the first–third on/off solenoid valves 81–83, which have been closed for setting the reverse drive range, are now opened, and the supply of hydraulic oil through these valves starts. At first, the line pressure PL which is supplied to the first on/off solenoid valve 81 through the oil passage 101a is now led to an oil passage 122 which is connected to the right end of the first shift valve 60. With this supply of the line pressure PL, the spool 60a of the first shift valve 60 is shifted leftward. As the oil passage 122 is connected also with the oil passage 105, the line pressure is supplied also to the left end of the D inhibitor valve 58 through the passage 105. As a result, the spool 58a of the D inhibitor valve shifts rightward. In this condition, the passage 106 which is connected to the left side oil chamber 72 of the forward/reverse selection hydraulic servomechanism 70 is connected to a drain through the D inhibitor valve 58, so the hydraulic oil in the left side oil chamber 72 is drained.

In the condition where the spool 58a of the D inhibitor valve 58 is shifted to the right side thereof, the line pressure PL is supplied into the D inhibitor valve 58 through the oil passages 101e and 135, and this pressure acts on the spool 58a to maintain the spool on the right side of the valve even after the line pressure supplied from the oil passage 105 is terminated. To the D inhibitor valve 58, another oil passage 139 is arranged such that the line pressure led through this passage acts on the spool 58a to shift the spool leftward. Therefore, only when the line pressure is led through this oil passage 139, the spool 58a of the D inhibitor valve 58 can shift leftward.

Also, the line pressure supplied through the oil passage 101a to the second on/off solenoid valve 82 is now led to the oil passage 121 which is connected to the right end of the second shift valve 62. With this supply of hydraulic pressure, the spool 62a of the second shift valve 62 shifts leftward. Furthermore, the line pressure supplied through the oil passage 101b to the third on/off solenoid valve 83 is led to the oil passage 123 which is connected to the right end of the third shift valve 64. With this pressure, the spool 64a of the third shift valve 64 shifts leftward. As a result, the oil passage 114 connected to the oil chamber of the FOURTH speed clutch 14 is now connected to a drain through a groove provided on the spool of the second shift valve 62, and the FOURTH speed clutch 14 is released to set a neutral condition.

In this condition, as the spool 58a of the D inhibitor valve 58 is maintained to the right side thereof, the passage 106 connected to the left side oil chamber 72 of the forward/reverse selection hydraulic servomechanism 70 is in fluid communication to a drain at the D inhibitor valve 58. On the other hand, the line pressure is supplied into the right side oil chamber 73 of the forward/reverse selection hydraulic servomechanism 70 as the oil passage 125 which is connected to the right side oil chamber 73 is in fluid communication with the oil passage 101e through an oil passage 126, the D inhibitor valve 58 and another oil passage 135. As a result, in the first neutral mode, the rod 71 of the forward/reverse selection hydraulic servomechanism 70 is shifted and maintained to the left side, so the dog clutch 16 is shifted and maintained to a D range position. In the first neutral mode, as the forward/reverse selection hydraulic servomechanism 70 remains in this condition, i.e., at the D range position, it is not possible to establish a reverse speed ratio.

In the second neutral mode, the first and fourth on/off solenoid valves 81 and 84 are turned on and are open while the second, third and fifth on/off solenoid valves 82, 83 and 85 are turned off and are closed. In response to this actuation condition of the solenoid valves, the shift valves are set as follows: the spool 60a of the first shift valve 60 is shifted leftward, the spool 62a of the second shift valve 62 is shifted rightward, the spool 64a of the third shift valve 64 is shifted rightward, the spool 66a of the fourth shift valve 66 is shifted rightward, and the spool 68a of the fifth shift valve 68 is shifted leftward.

In this condition, as the spool 66a of the fourth shift valve 66 is shifted rightward, the oil passage 125 connected to the right side oil chamber 73 of the forward/reverse selection hydraulic servomechanism 70 is connected to a drain at the fourth shift valve 66. On the other hand, the passage 106 connected to the left side oil chamber 72 of the forward/reverse selection hydraulic servomechanism 70 is connected to a drain through the D inhibitor valve 58 and the fifth shift valve 68. As a result, without any axially acting force, the rod 71 of the forward/reverse selection hydraulic servomechanism 70 remains in the same condition which has existed before the transmission takes this second neutral mode. No force is generated in the axial direction until the spool 68a of the fifth shift valve 68 is shifted rightward.

Now, each mode for the forward drive range (D range) is described. The in-gear mode takes place, for example, when the shift lever is manipulated from the N position to the D position to engage gears, and the in-gear mode prepares the transmission to start the engagement of the LOW clutch 11. In this mode, the second and third on/off solenoid valves 82 and 83 are turned on and are open while the first, fourth and fifth on/off solenoid valves 81, 84 and 85 are turned off and are closed. In response to this actuation condition of the solenoid valves, the shift valves are set as follows: the spool 60a of the first shift valve 60 is shifted rightward, the spool 62a of the second shift valve 62 is shifted leftward, the spool 64a of the third shift valve 64 is shifted leftward, the spool 66a of the fourth shift valve 66 is shifted leftward, and the spool 68a of the fifth shift valve 68 is shifted leftward.

In the in-gear mode, the LOW clutch 11 is controlled to engage gradually by the first linear solenoid valve 86. The hydraulic pressure adjusted by the first linear solenoid valve 86 is supplied to the oil passage 107 which is connected with the oil passage 108 through the CPB valve 56. This oil passage 108 is connected with another oil passage 128 through a passage which is created when the spool 68a of the fifth shift valve 68 is shifted leftward. The oil passage 128 is then connected with another oil passage 129 through a passage which is created when the spool 64a of the third shift valve 64 is shifted leftward. Then, the oil passage 129 is connected with another oil passage 130 through a passage which is created when the spool 62a of the second shift valve 62 is shifted leftward. This oil passage 130 is then connected with another oil passage 131 through a passage which is created when the spool 66a of the fourth shift valve 66 is shifted leftward. This oil passage 131 is then connected to the oil chamber of the LOW clutch 11 and to the LOW accumulator 75. In this arrangement, the LOW clutch 11 is engaged gradually in correspondence to the activation of the first linear solenoid valve 86.

In the in-gear mode, the oil passage 125 connected to the right side oil chamber 73 of the forward/reverse selection hydraulic servomechanism 70 is connected with the oil passage 126 through a passage which is created by the leftward shift of the spool 66a of the fourth shift valve 66. This oil passage 126 is then connected with the oil passage 135 which leads to the oil passage 101e, through a passage created by the rightward shift of the spool 58a of the D inhibitor valve 58. On the other hand, the passage 106 connected to the left side oil chamber 72 of the forward/reverse selection hydraulic servomechanism 70 is connected through the D inhibitor valve 58 with the oil passage 104 which is drained at the fifth shift valve 68 whose spool 68a is shifted on the left side thereof. As a result, the line pressure PL being supplied into the right side oil chamber 73 of the forward/reverse selection hydraulic servomechanism 70 acts on the rod 71 and pushes it leftward. Therefore, in the in-gear mode, the rod 71 of the forward/reverse selection hydraulic servomechanism 70 is shifted leftward as shown in the figure, so the dog clutch 16 shifts to the D range position and engages with the FOURTH speed driven gear 24b to connect it rotationally to the countershaft 3.

Now, a description is given of the LOW mode. In the LOW mode, which is set, for example, to start the vehicle when the D range is selected, the first~third on/off solenoid valves 81~83 are turned on and are opened while the fourth and fifth on/off solenoid valves 84 and 85 are turned off and are closed. In this condition, the spool 60a of the first shift valve 60 is shifted to the left side, the spool 62a of the second shift valve 62 is shifted to the left side, the spool 64a of the third shift valve 64 is shifted to the left side, the spool 66a of the fourth shift valve 66 is shifted to the left side, and the spool 68a of the fifth shift valve 68 is shifted to the left side.

The LOW mode differs from the in-gear mode only in the actuation of the first on/off solenoid valve 81. In the LOW mode, the first on/off solenoid valve 81 is turned on, so the spool 60a of the first shift valve 60 is shifted leftward. Then, the line pressure PL being supplied from the first on/off solenoid valve 81 to the oil passage 122 is led through the oil passage 105 to the left end of the D inhibitor valve 58, so the spool 58a of the D inhibitor valve 58 is shifted rightward. In this condition, the oil passage 135 branching from the oil passage 101e, to which the line pressure PL is being supplied, is connected with the oil passage 126 through the D inhibitor valve 58, so the line pressure PL is now supplied to the D inhibitor valve 58 through the oil passage 126.

In the condition where the oil passage 135 is connected with the oil passage 126, the spool 58a of the D inhibitor valve 58 is pushed rightward by the line pressure PL being supplied, so the spool 58a remains on the right side of the valve even after the line pressure supplied through the oil passage 105 is terminated. This spool 58a remains on the right side unless the line pressure from the oil passage 139 acts on the spool 58a and pushes leftward, which pressure is only available when the fourth on/off solenoid valve 84 is turned on to shift the spool 68a of the fifth shift valve 68 rightward. Therefore, once the spool 58a of the D inhibitor valve 58 is shifted rightward, it remains on the right side until the fourth on/off solenoid valve 84 is turned on.

Now, the oil passage 126 is connected with the oil passage 125 through a passage created by the leftward shift of the spool 66a of the fourth shift valve 66, so the line pressure PL is supplied through the oil passage 125 to the right side oil chamber 73 of the forward/reverse selection hydraulic servomechanism 70. As a result, the rod 71 in this valve is shifted leftward, so the dog clutch 16 is positioned at the D range position, engaging with the FOURTH speed driven gear 24b and connecting it rotationally to the countershaft 3. In the condition where the rod 71 is on the left side, the right side oil chamber 73 is connected to an oil passage 138 through which the line pressure PL is supplied to the second and third linear solenoid valves 87 and 88. Now, the line pressure PL is adjustable with the second and third linear solenoid valves 87 and 88, and this adjusted pressure can be supplied as control pressures to oil passages 140 and 142, respectively. However, no control pressure is output from these linear solenoid valves 87 and 88 in the LOW mode.

In the LOW mode, the control pressure being supplied from the first linear solenoid valve 86 to the oil passage 107 is led to the LOW clutch 11 in the same way as in the in-gear mode. Therefore, the engagement of the LOW clutch 11 is controlled in correspondence to the actuation of the first linear solenoid valve 86.

Now, a description is given of the 1-2-3 mode. This mode is set to shift the speed ratio of the transmission among the first (LOW), second, and THIRD speed ratios, i.e., to control the transition of speed ratio change. In this mode, the second and third on/off solenoid valves 82 and 83 are turned on and are opened while the first and fourth on/off solenoid valves 81 and 84 are turned off and are closed. The fifth on/off solenoid valve 85 is turned off when the FIRST speed ratio is established, and it is turned on or off in lock-up clutch actuation control (no description is provided on this control because it is not relevant to the present invention) when the second or THIRD speed ratio is established. In the 1-2-3 mode, the spool 60a of the first shift valve 60 is shifted rightward, the spool 62a of the second shift valve 62 is shifted leftward, the spool 64a of the third shift valve 64 is shifted leftward, and the spool 66a of the fourth shift valve 66 is shifted leftward.

As the fourth on/off solenoid valve 84 is turned off, the spool 58a of the D inhibitor valve 58 is maintained to the right side. In this condition, the line pressure PL is supplied to the right side oil chamber 73 of the forward/reverse selection hydraulic servomechanism 70, so the dog clutch 16 is maintained at the D range position. In this condition, the line pressure PL is supplied through the oil passage 138 to the second and third linear solenoid valves 87 and 88.

In this mode, the engagement of the LOW clutch 11, the SECOND speed clutch 12 or the THIRD speed clutch 13 is controlled in correspondence to the actuation of the first, second and third linear solenoid valve 86, 87 and 88. The control pressure being supplied from the first linear solenoid valve 86 to the oil passage 107 is led to the oil passage 108 through the CPB valve 56. This oil passage 108 is connected with the oil passage 128 through the fifth shift valve 68, and this oil passage 128 is connected with the oil passage 129 through the third shift valve 64. Then, this oil passage 129 is connected with the oil passage 130 through the second shift valve 62, and this oil passage 130 is connected with the oil passage 131 through the fourth shift valve 66. This oil passage 131 is then connected to the LOW clutch 11. In this condition, the engagement of the LOW clutch 11 is controlled by means of the control pressure supplied from the first linear solenoid valve 86.

The primary pressure of the second linear solenoid valve 87 is the pressure supplied through the oil passage 138, which pressure is supplied only when the forward/reverse selection hydraulic servomechanism 70 is set at the D range position. This primary pressure is adjusted by the second linear solenoid valve 87 to a control pressure which is supplied to an oil passage 140. In this present condition, this oil passage 140 is connected through the third shift valve 64 with an oil passage 145, which is connected with an oil passage 146 through the first shift valve 60. This oil passage 146 is then connected with another oil passage 147 through the second shift valve 62, and this oil passage 147 is then connected with another oil passage 148 through the first shift valve 60. Then, this oil passage 148 is connected with another oil passage 149 through the fourth shift valve 66, and this oil passage 149 is connected to the SECOND speed clutch 12, a hydraulic switch 92 and the SECOND accumulator 76. In this arrangement, the control pressure from the second linear solenoid valve 87 is utilized for the engagement control of the SECOND speed clutch 12. In addition, the hydraulic switch 92 is turned on for confirmation that the forward/reverse selection hydraulic servomechanism 70 is at the D range position.

The control pressure generated at the third linear solenoid valve 88 is supplied to the oil passage 142 which is connected with another oil passage 150 through the first shift valve 60. This oil passage 150 is connected through the third shift valve 64 with another oil passage 151 which is connected to the THIRD speed clutch 13 and the THIRD accumulator 77. As a result, the control pressure form the third linear solenoid valve 88 is utilized for the engagement control of the THIRD speed clutch 13.

Now, a description is given of the SECOND mode, which is set for the engagement of the SECOND speed clutch 12. In this mode, the second on/off solenoid valve 82 is turned on and is opened while the first, third and fourth on/off solenoid valves 81, 83 and 84 are turned off and are closed. The fifth on/off solenoid valve 85 is turned on or off depending upon the condition of the lock-up clutch actuation control. In this condition, the spool 60a of the first shift valve 60 is shifted rightward, the spool 62a of the second shift valve 62 is shifted leftward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the SECOND speed clutch 12 is controlled by the control pressure supplied from the second linear solenoid valve 87 to the oil passage 140. This oil passage 140 is connected through the third shift valve 64 with the oil passage 145, which is connected with the oil passage 146 through the first shift valve 60. This oil passage 146 is then connected with the oil passage 147 through the second shift valve 62, and this oil passage 147 is connected with the oil passage 148 through the first shift valve 60. Furthermore, this oil passage 148 is connected with the oil passage 149 through the fourth shift valve 66, and this oil passage 149 is connected to the SECOND speed clutch 12 and to the SECOND accumulator 76. In this arrangement, the engagement of the SECOND speed clutch 12 is controlled by the control pressure supplied from the second linear solenoid valve 87.

Here, the control of the lock-up clutch performed by the fifth on/off solenoid valve 85 is described briefly. By the turning on or off of this solenoid valve 85, the position of the spool 68a of the fifth shift valve 68 is controlled leftward or rightward, respectively. In the condition where this spool 68a is shifted leftward, the oil passage 101e is connected with another oil passage 155, and the line pressure PL is supplied to the left end of the lock-up shift valve 51. On the other hand, in the condition where the spool 68a is shifted rightward, the oil passage 155 is connected to a drain at the fifth shift valve 68, so no pressure is supplied to the left end of the lock-up shift valve 51. In this way, the turning on and off of the fifth on/off solenoid valve 85 is utilized for the control of the actuation of the lock-up shift valve 51.

The lock-up shift valve 51 is a valve to turn on or off the lock-up actuation, and the engagement of the lock-up clutch is controlled by the control pressure supplied from the first linear solenoid valve 86. The control pressure from the first linear solenoid valve 86 is led to the oil passage 107, which is connected through another oil passage 157 to the lock-up control valve 52. Thus, the actuation of the lock-up control valve 52, which is controlled by the control pressure from the first linear solenoid valve 86, controls the engagement of the lock-up clutch. This engagement control of the lock-up clutch is carried out in the same way for the speed ratios which are equal to or higher than the SECOND speed ratio.

Now, a description is given of the THIRD mode, which is set for the engagement of the THIRD speed clutch 13. In this mode, the first~fourth on/off solenoid valves 81 84 are turned off and are closed. The fifth on/off solenoid valve 85 is turned on or off depending upon the condition of the lock-up clutch actuation control as in the above described mode. In this condition, the spool 60a of the first shift valve 60 is shifted rightward, the spool 62a of the second shift valve 62 is shifted rightward, the spool 64a of the third shift valve 64 is shifted rightward, and the spool 66a of the fourth shift valve 66 is shifted leftward.

As the fourth on/off solenoid valve 84 is turned off also in this mode, the spool 58a of the D inhibitor valve 58 is maintained on the right side. Therefore, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the THIRD speed clutch 13 is controlled by the control pressure supplied from the third linear solenoid valve 88 to the oil passage 142, which is connected with another oil passage 160 through the first shift valve 60. This oil passage 160 is then connected with another oil passage 161 through the second shift valve 62, and this oil passage 161 is then connected through the third shift valve 64 with the oil passage 151, which is connected to the THIRD speed clutch 13 and to the THIRD accumulator 77. In this arrangement, the engagement of the THIRD speed clutch 13 is controlled by the control pressure from the third linear solenoid valve 88.

Now, a description is given of the 2-3-4 mode. This mode is set to shift the speed ratio of the transmission among the SECOND, THIRD and FOURTH speed ratios, i.e., to control the transition of speed ratio change. In this mode, the third on/off solenoid valve 83 is turned on and is opened while the first, second and fourth on/off solenoid valves 81, 82 and 84 are turned off and are closed. The fifth on/off solenoid valve 85 is used in the lock-up clutch actuation control as briefly described above. In the 2-3-4 mode, the spool 60a of the first shift valve 60 is shifted rightward, the spool 62a of the second shift valve 62 is shifted rightward, the spool 64a of the third shift valve 64 is shifted leftward, and the spool 66a of the fourth shift valve 66 is shifted leftward.

Also in this mode, as the fourth on/off solenoid valve 84 is turned off, the spool 58a of the D inhibitor valve 58 is maintained on the right side thereof. In this condition, the line pressure PL is supplied to the right side oil chamber 73 of the forward/reverse selection hydraulic servomechanism 70, so the dog clutch 16 is retained at the D range position. In this condition, the line pressure PL is supplied through the oil passage 138 to the second and third linear solenoid valves 87 and 88.

In this mode, the engagement of the SECOND speed clutch 12, the THIRD speed clutch 13 and the FOURTH speed clutch 14 is controlled in correspondence to the actuation of the first, second and third linear solenoid valves 86, 87 and 88 to shift the transmission smoothly among these speed ratios.

The control pressure supplied from the first linear solenoid valve 86 to the oil passage 107 is led to the oil passage 108 through the CPB valve 56. This oil passage 108 is connected through the fifth shift valve 68 with the oil passage 128, which is connected with the oil passage 129 through the third shift valve 64. Then, this oil passage 129 is connected with the oil passage 147 through the second shift valve 62, and this oil passage 147 is connected with the oil passage 148 through the first shift valve 60. This oil passage 148 is then connected through the fourth shift valve 66 with the oil passage 149, which is connected to the SECOND speed clutch 12. In this arrangement, the engagement of the SECOND speed clutch 12 is controlled by the control pressure supplied from the first linear solenoid valve 86.

The control pressure from the second linear solenoid valve 87 is led to the oil passage 140, which is connected with the oil passage 113 through the third shift valve 64. This oil passage 113 is connected with the oil passage 114 through the second shift valve 62, and this oil passage 114 is connected to the FOURTH speed clutch 14 and to the FOURTH accumulator 78. In this arrangement, the engagement of the FOURTH speed clutch 14 is control by the control pressure supplied from the second linear solenoid valve 87.

The control pressure from the third linear solenoid valve 88 is supplied to the oil passage 142, which is connected with the oil passage 150 through the first shift valve 60. This oil passage 150 is then connected with the oil passage 151 through the third shift valve 64, and then this oil passage 151 is connected to the THIRD speed clutch 13 and to the THIRD accumulator 77. In this arrangement, the engagement control of the THIRD speed clutch 13 is controlled by the control pressure form the third linear solenoid valve 88.

Now, a description is given of the FOURTH mode, which is set for the engagement of the FOURTH speed clutch 14. In this mode, the first and third on/off solenoid valves 81 and 83 are turned on and are opened while the second and fourth on/off solenoid valves 82 and 84 are turned off and are closed. The fifth on/off solenoid valve 85 is turned on or off depending upon the condition of the lock-up clutch actuation control as described above. In this condition, the spool 60a of the first shift valve 60 is shifted leftward, the spool 62a of the second shift valve 62 is shifted rightward, the spool 64a of the third shift valve 64 is shifted leftward, and the spool 66a of the fourth shift valve 66 is shifted leftward.

Also, in this mode, as the fourth on/off solenoid valve 84 is turned off, the spool 58a of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. The line pressure PL is also supplied through the oil passage 138 to the second and third linear solenoid valves 87 and 88.

In this mode, the engagement of the FOURTH speed clutch 14 is controlled by the control pressure supplied from the second linear solenoid valve 87 to the oil passage 140, which is connected with the oil passage 113 through the third shift valve 64. This oil passage 113 is connected with the oil passage 114 through the second shift valve 62, and this oil passage 114 is then connected to the FOURTH speed clutch 14 and to the FOURTH accumulator 78. In this arrangement, the engagement of the FOURTH speed clutch 14 is controlled by the control pressure from the second linear solenoid valve 87.

Now, a description is made of the 4-5 mode, which is set to shift the speed ratio of the transmission between the FOURTH and FIFTH speed ratios, i.e., to control the transition of speed ratio change. In this mode, the first on/off solenoid valve 81 is turned on and is opened while the second ~ fourth on/off solenoid valves 82, 83 and 84 are turned off and are closed. The fifth on/off solenoid valve 85 is used in the lock-up clutch actuation control. In the 4-5 mode, the spool 60a of the first shift valve 60 is shifted leftward, the spool 62a of the second shift valve 62 is shifted rightward, the spool 64a of the third shift valve 64 is shifted rightward, and the spool 66a of the fourth shift valve 66 is shifted leftward.

Also in this mode, as the fourth on/off solenoid valve 84 is turned off, the spool 58a of the D inhibitor valve 58 is retained on the right side thereof In this condition, the line pressure PL is supplied to the right side oil chamber 73 of the forward/reverse selection hydraulic servomechanism 70, so the dog clutch 16 is retained at the D range position. Furthermore, the line pressure PL is supplied through the oil passage 138 to the second and third linear solenoid valves 87 and 88.

In this mode, the engagement of the FOURTH speed clutch 14 and of the FIFTH speed clutch 15 is controlled in correspondence to the actuation of the second and third linear solenoid valves 87 and 88, respectively, to change the speed ratio of the transmission smoothly.

The control pressure from the second linear solenoid valve 87 is led to the oil passage 140. This oil passage 140 is connected with the oil passage 113 through the third shift valve 64, and this oil passage 113 is connected through the second shift valve 62 with the oil passage 114, which is connected to the FOURTH speed clutch 14 and to the FOURTH accumulator 78. In this arrangement, the engagement of the FOURTH speed clutch 14 is controlled by the control pressure from the second linear solenoid valve 87.

On the other hand, the control pressure from the third linear solenoid valve 88 is led to the oil passage 142, which is connected with another oil passage 170 through first shift valve 60. This oil passage 170 is then connected through the third shift valve 64 with another oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

Now, a description is made of the FIFTH mode, which is set for the engagement of the FIFTH speed clutch 15. In this mode, the first and second on/off solenoid valves 81 and 82 are turned on and are opened while the third and fourth on/off solenoid valves 83 and 84 are turned off and are closed. The fifth on/off solenoid valve 85 is turned on or off depending upon the condition of the lock-up clutch actuation control as described above. In this condition, the spool 60*a* of the first shift valve 60 is shifted leftward, the spool 62*a* of the second shift valve 62 is shifted leftward, the spool 64*a* of the third shift valve 64 is shifted rightward, and the spool 66*a* of the fourth shift valve 66 is shifted leftward.

Also, in this mode, as the fourth on/off solenoid valve 84 is turned off, the spool 58*a* of the D inhibitor valve 58 is retained on the right side thereof. As a result, the line pressure PL is supplied to the right side oil chamber 73 of the forward/reverse selection hydraulic servomechanism 70, so the dog clutch 16 is retained at the D range position. The line pressure PL is also supplied through the oil passage 138 to the second and third linear solenoid valves 87 and 88.

In this mode, the engagement of the FIFTH speed clutch 15 is controlled by the control pressure supplied from the third linear solenoid valve 88 to the oil passage 142, which is connected with the oil passage 170 through the first shift valve 60. This oil passage 170 is connected through the third shift valve 64 with the oil passage 171, which is connected to the FIFTH speed clutch 15 and to the FIFTH accumulator 79. In this arrangement, the engagement of the FIFTH speed clutch 15 is controlled by the control pressure from the third linear solenoid valve 88.

As described above, each mode is established by controlling the turning on and off of the first–fifth on/off solenoid valves 81–85 as listed in Table 1. The alphabets on the left side of Table 1, "R", "N" and "D", represent the reverse drive range, the neutral range and the forward drive range, respectively, which are switched one after another in correspondence to the manipulation of the shift lever at the driver's seat. For example, in a case where the shift lever is manipulated to shift the range setting of the transmission from the R range through the N range to the D range, at first, the second neutral mode is set as the N range. In this N range condition, the rod 71 of the forward/reverse selection hydraulic servomechanism 70 is retained at the reverse drive position without any force acting in the axial direction. Thereafter, when the shift lever is manipulated to the D range, the control system proceeds to set the transmission into the in-gear mode and then into the LOW mode.

On the other hand, in a case where the shift lever is manipulated to switch the range of the transmission from the D range to the N range and then from the N range to the R range, if the speed of the vehicle at the time of the switching to the N range is less than a critical speed or predetermined speed (e.g., 10 km/h), then the control system sets the second neutral mode. In this N range condition, the rod 71 of the forward/reverse selection hydraulic servomechanism 70 is retained at the forward drive position without any force acting in the axial direction. Thereafter, when the shift lever is manipulated to the R range, the control system proceeds to set the transmission into the REVERSE mode.

On the other hand, if the speed of the vehicle at the time of the switching to the N range is equal to or more than the critical speed, then the control system sets the first neutral mode. As described above, in this mode, the rod 71 of the forward/reverse selection hydraulic servomechanism 70 is retained at the forward drive position with a force acting in the axial direction toward the forward drive position, which force is generated by the line pressure supplied into the right side oil chamber a 73. In this condition, even if a solenoid valve malfunctions and engages a corresponding clutch, the reverse speed ratio cannot be established. When the speed of the vehicle decreases below the critical speed, the first neutral mode is switched to the second neutral mode. However, if the shift lever is manipulated to set the R range while the vehicle is driving still at a speed equal to or more than the critical speed, then the control system retains the first neutral mode and does not proceed to set the REVERSE mode, i.e., the control system provides the above mentioned inhibitor function. Thereafter, when the vehicle speed decreases below the critical speed, the control system proceeds to set the transmission into the REVERSE mode.

Finally, a description is made of the F/S (Fail Safe) SECOND mode. This mode is set to secure a certain driving performance by fixing the transmission to the SECOND speed ratio when the transmission experiences a breakdown. In this mode, the first–fourth on/off solenoid valves 81–84 are turned on and are opened while the fifth on/off solenoid valve 85 is turned off and is closed. In this condition, the spool 60*a* of the first shift valve 60 is shifted leftward, the spool 62*a* of the second shift valve 62 is shifted leftward, the spool 64*a* of the third shift valve 64 is shifted leftward, the spool 66*a* of the fourth shift valve 66 is shifted rightward, and the spool 68*a* of the fifth shift valve 68 is shifted leftward.

In this mode, the engagement of the SECOND speed clutch 12 is controlled by the control pressure supplied from the first linear solenoid valve 86 to the oil passage 107, which is connected with the oil passage 108 through the CPB valve 56. This oil passage 108 is connected with the oil passage 128 through the fifth shift valve 68, and this oil passage 128 is connected with the oil passage 129 through the third shift valve 64. This oil passage 129 is then connected with the oil passage 130 through the second shift valve 62, and this oil passage 130 is connected through the fourth shift valve 66 with the oil passage 149, which is connected to the SECOND speed clutch 12 and to the SECOND accumulator 76. In this arrangement, the engagement of the SECOND speed clutch 12 is controlled by the control pressure supplied from the first linear solenoid valve 86.

It can be understood from the above description that the engagement of the SECOND–FIFTH speed clutches 12–15 are controlled for setting the SECOND mode and higher modes (excluding the F/S mode), respectively, by the control pressures which are supplied from the second and third linear solenoid valves 87 and 88. The primary pressures supplied to the second and third linear solenoid valves 87 and 88 are led through the forward/reverse selection hydraulic servomechanism 70. For example, if the forward/reverse selection hydraulic servomechanism 70 experiences an operational failure, then these clutches cannot be controlled systematically. However, the engagement of the SECOND speed clutch 12 in the F/S (Fail Safe) SECOND mode is controlled by the first linear solenoid valve 86, which utilizes the line pressure PL being supplied directly from the oil passage 100*b* bypassing the forward/reverse selection hydraulic servomechanism 70. Therefore, the SECOND speed ratio can be established regardless of any operational failure of the forward/reverse selection hydraulic servomechanism 70.

Figure 12:
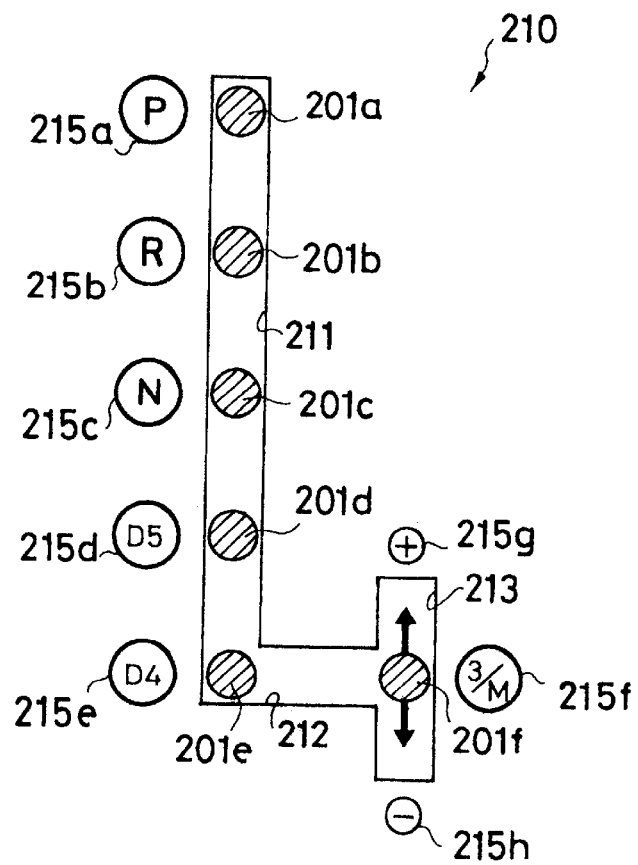
FIG. 12 is a schematic diagram of a shift manipulation unit.

Now, the shift manipulation unit 200 will be described in reference to FIG. 12. As shown in FIG. 1, the shift manipulation unit 200 comprises a shift box 210 and a shift lever 201, which is provided pivotally in the shift box 210 and has a knob 202 at the top thereof As shown in FIG. 12, the shift box 210 is provided with a first shift guide path 211, a connection shift guide path 212 and a second shift guide path 213 in a form of slot, through which the shift lever 201 extrudes out of the shift box 210. The first shift guide path 211 extends linearly forward, and the connection shift guide path 212 extends laterally from the rear end of the first shift guide path 211, connecting to the second shift guide path 213, which extends forward and rearward from this connection point as shown in the figure.

Therefore, the driver can grip the knob 202 and manipulate the shift lever 201 along the first shift guide path 211, the connection shift guide path 212 and the second shift guide path 213 pivotally in the shift box 210. The shift manipulation unit 200 is equipped with the following positions for drive range selection, which is selectable by the manipulation of the shift lever 201: "P" position parking position) indicated with 201a in the figure, "R" position (reverse drive position) indicated with 201b, "N" position (neutral position) indicated with 201c, "D5" position (first automatic shift control position) indicated with 201d, "D4" position (second automatic shift control position) indicated with 201e and "3/M" position (manual shift control position) indicated with 201f. Furthermore, the shift lever 201 at the "3/M" position can be swiveled from there along the second shift guide path 213 toward the "+" side ("up" side) or the "−"side ("down" side) as shown in the figure.

Accordingly, seven fixed marks are provided on the shift box 210: position mark "P" 215a, position mark "R" 215b, position mark "N" 215c, position mark "D5" 215d, position mark "D4" 215e, position mark "3/M" 215f, mark "+" 215g and mark "−" 215h to indicate the above mentioned respective positions. These marks are helpful for the driver to confirm the current position of the shift lever.

Figure 13:
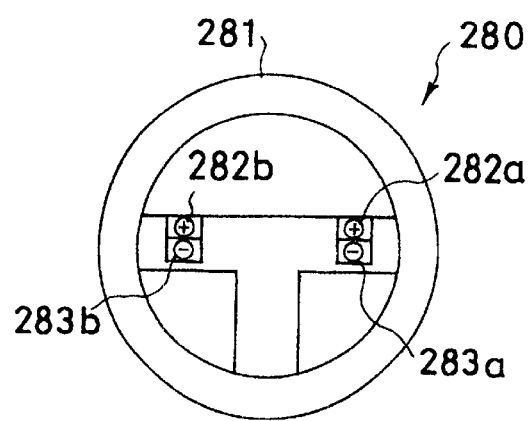
FIG. 13 is a schematic diagram of a shift manipulation switching unit.

Now, the shift manipulation switching unit 280 is described in reference to FIG. 13. This unit comprises "+" shift switches 282a and 282b and "−" shift switches 283a and 283b, which are provided on the right and left sides at the central part of the steering wheel 281. The turning on of a "+" switch 282a or 282b on either side of the steering wheel causes to generate the same control signal as is generated when the shift lever 201 at the "3/M" position is swiveled onto the "+" side. Also, the turning on of a "−" switch 283a or 283b on either side causes to generate the same control signal as is generated when the shift lever 201 at the "3/M" position is swiveled onto the "−" side.

Figure 14:
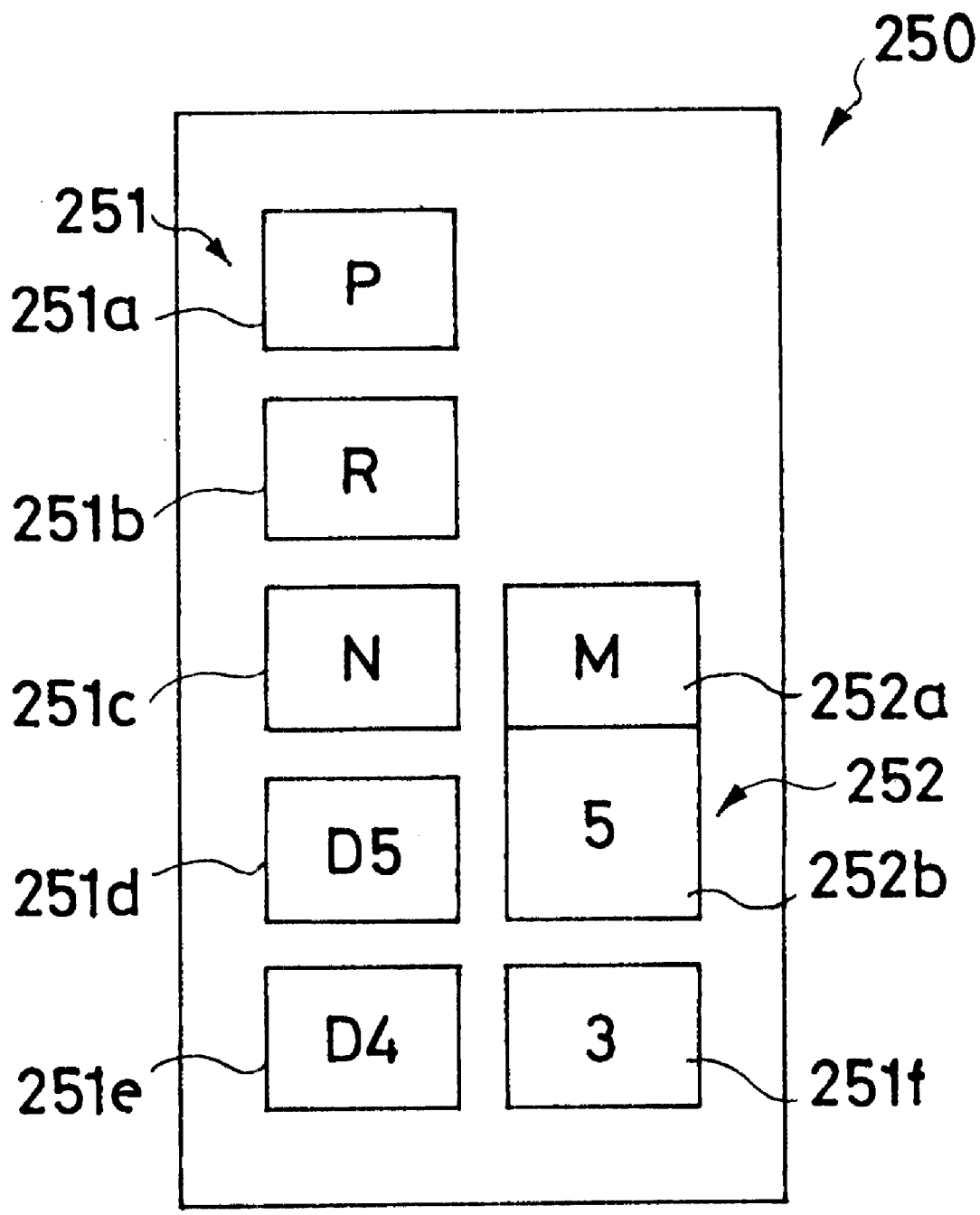
FIG. 14 is a schematic diagram of a shift indicator unit.

Here, the shift indicator unit 250 is described in reference to FIG. 14. This unit is to display some information on the instrument panel of the vehicle in response to the shift manipulation performed by the driver. The shift indicator unit 250 comprises a first indicator unit 251 which makes an appropriate indication to indicate the present position of the shift lever 201 and a second indicator unit 252 which makes an appropriate indication when the shift lever 201 at the "3/M" position is manipulated.

The first indicator unit 251 comprises a "P" position lamp 251a, an "R" position lamp 251b, an "N" position lamp 251c, a "D5" position lamp 251d, a "D4" position lamp 251e and a "3" position lamp 251f, each of which lights up correspondingly when the shift lever 201 is shifted among the above described "P" position 201a, "R" position 201b, "N" position 201c, "D5" position 201d, "D4" position 201e and "3/M" position 201f. On the other hand, the second indicator unit 252 comprises an "M" range lamp 252a, which lights up when the shift lever 201 at the "3/M" position is swiveled toward the "+" side or the "−" side for a manual shift control ("M" range), and a speed ratio indicator 252b, which displays a number to indicate the speed ratio established by the manipulation of the shift lever 201 toward the "+" side or the "−" side.

Now, in reference to FIG. 15, a description is given of the shift control executed in response to the operation of the above described shift manipulation unit 200 and shift manipulation switching unit 280 and the operation of the shift indicator unit 250. At first, when the shift lever 201 is shifted to the "P" position 201a, the transmission is set into neutral, and a parking gear provided in the transmission is fixed to keep the vehicle stationary. At the same time, the "P" position lamp 251a lights up. Here, no description is given of the parking gear because such a mechanism is well known in this field.

When the shift lever 201 is shifted from the "P" position 201a to the "R" position 201b, the parking gear is released, the reverse speed ratio is established, and the "R" position lamp 251b lights up. Then, when the shift lever 201 is shifted from the "R" position 201b to the "N" position 201c, the transmission is set into the neutral range, and the "N" position lamp 251c lights up.

When the shift lever 201 is shifted from the "N" position 201c to the "D5" position 201d, the transmission is set into the "D5" range, and the "D5" position lamp 251d lights up. In the "D5" range, an automatic shift control is executed with five forward drive speed ratios, i.e., FIRST (LOW), SECOND, THIRD, FOURTH and FIFTH speed ratios. In this automatic shift control, the shift control is executed automatically, for example, in accordance with a predetermined shift control map in response to the actual speed of the vehicle and the actual throttle opening of the engine.

When the shift lever 201 is shifted from the "D5" position 201d to the "D4" position 201e, the transmission is set into the "D4" range, and the "D4" position lamp 251e lights up. In the "D4" range, an automatic shift control is executed with four forward drive speed ratios, i.e., FIRST (LOW), SECOND, THIRD and FOURTH speed ratios, in accordance with a predetermined shift control map in the same way as the automatic shift control of the "D5" range.

When the shift lever 201 is shifted from the "D4" position 201e to the "3/M" position 201f laterally along the connection shift guide path 212, the transmission is set into the "3" range, and the "3" position lamp 251f lights up. More specifically, when the shift lever 201 is shifted from the "D4" position 201e to the "3/M" position 201f, at first, the transmission is downshifted to the speed ratio which is immediately one step below the speed ratio that has been set until this shifting of the shift lever. Then, an automatic shift control is executed with three forward drive speed ratios, FIRST (LOW), SECOND and THIRD speed ratios. Alternatively, the shift control system may be designed such that when the shift lever 201 is shifted from the "D4" position 201e to the "3/M" position 201f, the transmission is downshifted by one step, and the newly established speed ratio is maintained without a further automatic shift control.

After the "3" range is established by the shift of the shift lever 201 to the "3/M" position 201f, once the shift lever 201 at the "3/M" position 201f is swiveled along the second shift guide path 213 toward the "+" side or the "−" side, the transmission is set into the "M" range, and the "M" range lamp 252a lights up. At the same time, if this swiveling of the shift lever has been toward the "+" side, then the speed ratio of the transmission is upshifted by one step, but if the swiveling has been toward the "−" side, then the speed ratio is downshifted by one step. Simultaneously, the speed ratio established is indicated with a corresponding number on the speed ratio indicator 252b. Thereafter, each swiveling of the shift lever 201 to the "+" side or to the "−" side effects an upshift or a downshift in steps, respectively, and the speed ratio selected and established by each manipulation is indicated with a corresponding number on the speed ratio indicator 252b.

Figure 16:
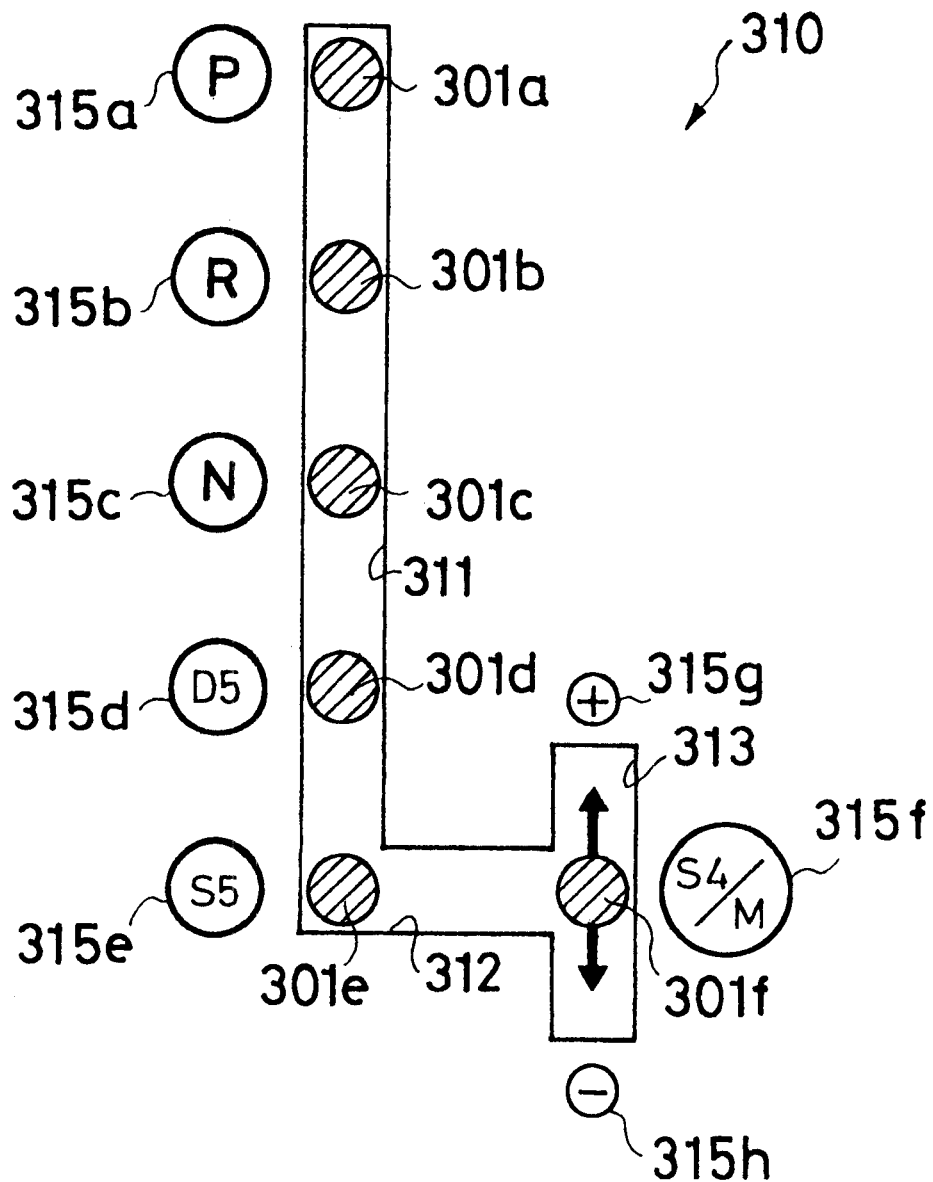
FIG. 16 is a schematic diagram of a second embodiment of shift manipulation unit.

Now, a second embodiment of shift control system according to the present invention is described in reference to FIGS. 16 and 17. The transmission and the hydraulic circuit controlled by this shift control system are constructed in the same way as for the above described embodiment. However, the shift box 310 of this shift control system is constructed as shown in FIG. 16. This shift box 310 is provided with a first shift guide path 311, a connection shift guide path 312 and a second shift guide path 313 in a form of slot. The first shift guide path 311 extends linearly forward, and the connection shift guide path 312 extends laterally from the rear end of the first shift guide path 311, connecting to the second shift guide path 313, which extends forward and rearward from the right end of the connection shift guide path 312.

Therefore, the driver can manipulate the shift lever along these shift guide paths to the following positions for drive range selection: "P" position (parking position) indicated with 30 1a in the figure, "R" position (reverse drive position) indicated with 301b, "N" position (neutral position) indicated with 301c, "D5" position (first automatic shift control position) indicated with 301d, "S5" position (second automatic shift control position) indicated with 301e and "S4/M" position (manual shift control position) indicated with 301f. Furthermore, the shift lever at the "S4/M" position 301f can be swiveled along the second shift guide path 313 toward the "+" side or the "−" side as shown in the figure.

Accordingly, seven fixed marks are provided on the shift box 310: position mark "P" 315a, position mark "R" 315b, position mark "N" 315c, position mark "D5" 315d, position mark "S5" 315e, position mark "S4/M" 315f, mark "+" 315g and mark "−" 315h to indicate the above mentioned respective positions. These marks are helpful for the driver to confirm the current position of the shift lever.

In this shift control system, when the shift lever of the shift manipulation unit is shifted to the "P" position 301a, the transmission is set into neutral, and a parking gear provided in the transmission is fixed to keep the vehicle stationary. When the shift lever is shifted from the "P" position 301a to the "R" position 301b, the parking gear is released, and the reverse speed ratio is established. Then, when the shift lever is shifted from the "R" position 301b to the "N" position 301c, the transmission is set into the neutral range.

When the shift lever is shifted from the "N" position 301c to the "D5" position 301d, the transmission is set into the "D5" range for an automatic shift control with five forward drive speed ratios, i.e., FIRST (LOW), SECOND, THIRD, FOURTH and FIFTH speed ratios. This automatic shift control is performed, for example, in accordance with a predetermined shift control map.

When the shift lever is shifted from the "D5" position 301d to the "S5" position 301e, the transmission is set into the "S5" range. In the "S5" range, an automatic shift control is executed also with the five forward drive speed ratios, FIRST (LOW), SECOND, THIRD, FOURTH and FIFTH speed ratios. However, the automatic shift control in the "S5" range is controlled in accordance with a predetermined shift control map which is different from the above mentioned map used for the automatic shift control in the "D5" range. The speed ratio shift lines for shifting the speed ratios in the "S5" range are mapped closer to higher speeds than those for the "D5" range. As a result, while the speed of the vehicle is increasing in the "S5" range, upshifts are executed at higher speed than in the "D5" range. Therefore, the "S5" range effects the speed change of the vehicle more at lower speed ratios than the "D5" range, making the vehicle to offer a feel of acceleration and, thereby, making the vehicle sporty.

Then, when the shift lever is shifted from the "S5" position 301e to the "S4/M" position 301f laterally along the connection shift guide path 312, the transmission is set into the "S4" range for an automatic shift control with four forward drive speed ratios, FIRST (LOW), SECOND, THIRD and FOURTH speed ratios. In the "S4" range, the automatic shift control is executed in accordance with the same shift control map that is used for the automatic shift control of the "S5" range. Therefore, the "S4" range also offers a great feeling of acceleration to make the vehicle sporty. More specifically, when the shift lever is shifted from the "S5" position 301e to the "S4/M" position 301f, at first, the transmission is downshifted to the speed ratio which is immediately one step below the speed ratio that has been set until this shifting of the shift lever. Then, an automatic shift control is executed with four forward drive speed ratios, FIRST (LOW), SECOND, THIRD and FOURTH speed ratios. Alternatively, the shift control system may be arranged such that when the shift lever is shifted from the "S5" position 301e to the "S4/M" position 301f, the transmission is downshifted by one step, and the newly established speed ratio is maintained without a further automatic shift control.

After the "S4" range is established by the shift of the shift lever to the "S4/M" position 301f, once the shift lever at the "S4/M" position 301f is swiveled along the second shift guide path 313 toward the "+" side or the "−" side, the transmission is set into the "M" range. At the same time, if this swiveling of the shift lever has been toward the "+" side, then the speed ratio of the transmission is upshifted by one step, but if the swiveling has been toward the "−" side, then the speed ratio is downshifted by one step. Thereafter, each swiveling of the shift lever to the "+" side or to the "−" side effects an upshift or a downshift, respectively.

Figure 18:
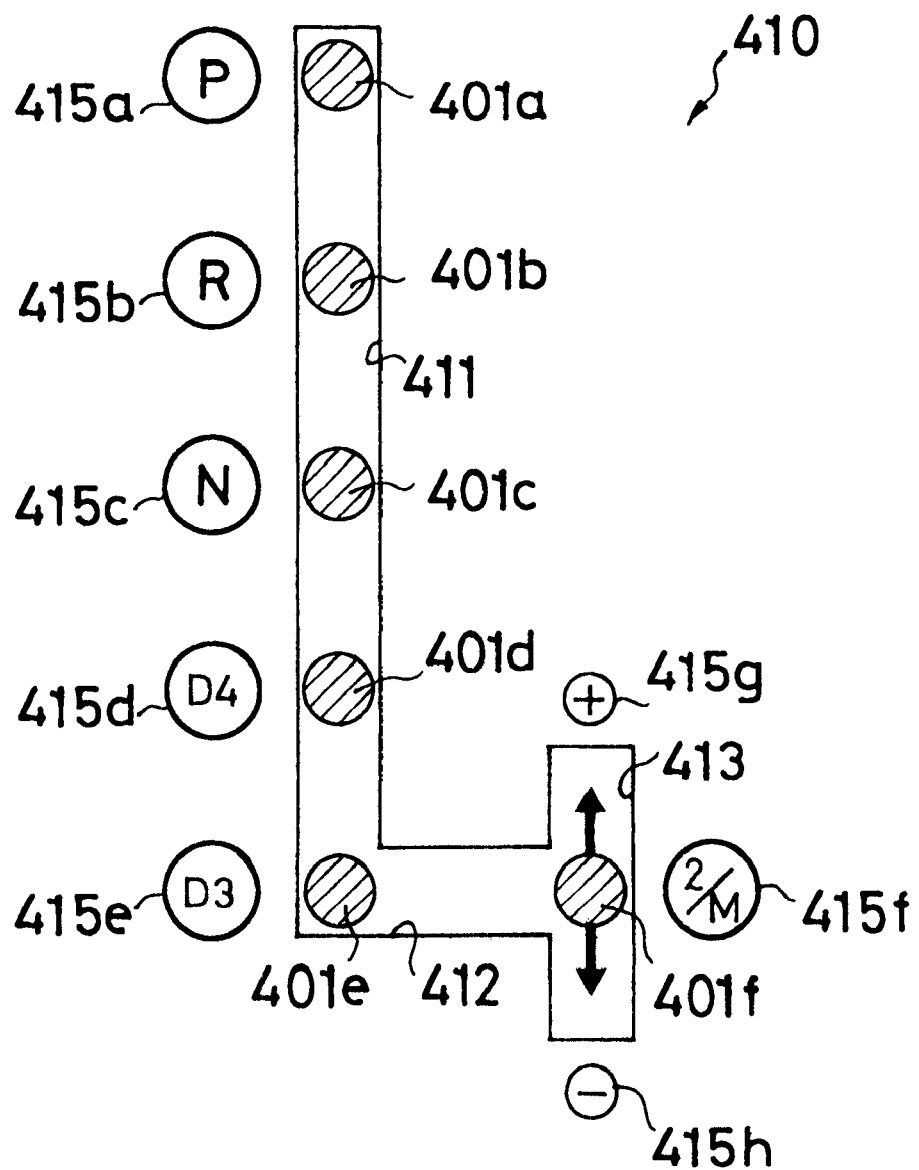
FIG. 18 is a schematic diagram of a third embodiment of shift manipulation unit.

The embodiments of shift control system according to the present invention have been described for a transmission which has five forward drive speed ratios and one reverse drive speed ratio. However, the present invention is not limited by the number of speed ratios, and a shift control system according to the present invention can be applied also to a transmission which has a greater or smaller number of forward drive speed ratios than the above described transmission. For example, this shift control system can be applied to a transmission with four forward drive speed ratios as shown in FIG. 18.

In this case, the shift box 410 is provided with a first shift guide path 411, a connection shift guide path 412 and a second shift guide path 413 in a form of slot. The first shift guide path 411 extends linearly forward, and the connection shift guide path 412 extends laterally from the rear end of the first shift guide path 411, connecting to the second shift guide path 413, which extends forward and rearward from the right end of the connection shift guide path 412.

Therefore, the driver can manipulate the shift lever along these shift guide paths to the following positions for drive range selection: "P" position (parking position) indicated with 401a in the figure, "R" position (reverse drive position) indicated with 401b, "N" position (neutral position) indicated with 401c, "D4" position (first automatic shift control position) indicated with 401d, "D3" position (second automatic shift control position) indicated with 401e and "2/M" position (manual shift control position) indicated with 401f. Furthermore, the shift lever which has been positioned at the "2/M" position 401f can be swiveled along the second shift guide path 413 toward the "+" side or the "−" side as shown in the figure.

Accordingly, seven fixed marks are provided on the shift box 410: position mark "P" 415a, position mark "R" 415b, position mark "N" 415c, position mark "D4" 415d, position mark "D3" 415e, position mark "2/M" 415f, mark "+" 415g and mark "−" 415h to indicate the above mentioned respective positions. These marks are helpful for the driver to confirm the current position of the shift lever.

In this shift control system, when the shift lever of the shift manipulation unit is shifted to the "P" position 401a, the transmission is set into neutral, and a parking gear provided in the transmission is fixed to keep the vehicle stationary. When the shift lever is shifted from the "P" position 401a to the "R" position 401b, the parking gear is released, and the reverse speed ratio is established. Then, when the shift lever is shifted from the "R" position 401b to the "N" position 401c, the transmission is set into the neutral range.

When the shift lever is shifted from the "N" position 401c to the "D4" position 401d, the transmission is set into the "D4" range for an automatic shift control with four forward drive speed ratios, i.e., FIRST (LOW), SECOND, THIRD and FOURTH speed ratios. This automatic shift control is performed, for example, in accordance with a predetermined shift control map. When the shift lever is shifted from the "D4" position 401d to the "D3" position 401e, the transmission is set into the "D3" range. In the "D3" range, an automatic shift control is executed with the three forward drive speed ratios, FIRST (LOW), SECOND and THIRD speed ratios in accordance with the shift control map.

Then, when the shift lever is shifted from the "D3" position 401e to the "2/M" position 401f laterally along the connection shift guide path 412, the transmission is set into the "2" range, where an automatic shift control is performed with two forward drive speed ratios, FIRST (LOW) and SECOND speed ratios. More specifically, when the shift lever is shifted from the "D3" position 401e to the "2/M" position 401f, at first, the transmission is downshifted to the speed ratio which is immediately one step below the speed ratio that has been set until this shifting of the shift lever. Then, an automatic shift control is executed with the two forward drive speed ratios. Alternatively, the shift control system may be arranged such that when the shift lever is shifted from the "D3" position 401e to the "2/M" position 401f, the transmission is downshifted by one step, and the newly established speed ratio is maintained without a further automatic shift control.

After the "2" range is established by the shift of the shift lever to the "2/M" position 401f, once the shift lever at the "2/M" position 401f is swiveled along the second shift guide path 413 toward the "+" side or the "−" side, the transmission is set into the "M" range. At the same time, if this swiveling of the shift lever has been toward the "+" side, then the speed ratio of the transmission is upshifted by one step, but if the swiveling has been toward the "−" side, then the speed ratio is downshifted by one step. Thereafter, each swiveling of the shift lever to the "+" side or to the "−" side effects an upshift or a downshift, respectively.

As described above, a shift control system according to the present invention is provided with a first shift guide path, a connection shift guide path and a second shift guide path, such that the shift lever is led along the first shift guide path from a first automatic shift control position to a second automatic shift control position and further along the connection shift guide path to a manual shift control position, where the shift lever is swiveled along the second shift guide path to execute a manual shift control. Therefore, for example, when the shift lever is at the first automatic shift control position, an automatic shift control can be performed with all the speed ratios including the highest speed ratio. If the shift lever is shifted along the first shift guide path from the first automatic shift control position to the second automatic shift control position while the vehicle is traveling at the highest speed ratio, then the transmission is downshifted to the second highest speed ratio, effecting an action of engine brake. Furthermore, if the shift lever is shifted along the connection shift guide path from the second automatic shift control position to the manual shift control position while the vehicle is traveling at the second highest speed ratio, then the transmission is downshifted to the third highest speed ratio, increasing the effect of the engine brake. In this way, a downshifting is effected for each step in the manipulation of the shift lever. Especially, it should be noted that a speed ratio change is executed also when the shift lever is shifted along the connection shift guide path. As a result, the number of actions taken by the driver for the shift manipulation is relatively small, so the shift control system according to the present invention is superior in operativity.

Moreover, in the shift control system according to the present invention, the shift lever at the manual shift control position is swiveled along the second shift guide path for a speed ratio change, i.e., a manual control of speed ratio change. Therefore, the shift control system according to the present invention offers good operativity not only for switching the drive ranges but also for manually selecting an appropriate speed ratio.

While a speed ratio which is one step lower than the highest speed ratio is set as the above mentioned second highest speed ratio, a speed ratio which is one step lower the second highest speed ratio is set as the third highest speed ratio, and the shift control system can be arranged in the following fashion. When the shift lever is shifted from the second automatic shift control position to the manual shift control position, the transmission is shifted to a speed ratio lower than the speed ratio that has been in effect prior to this shifting of the shift lever, and then an automatic shift control is executed with forward drive speed ratios up to the third highest speed ratio as long as the shift lever is not operated thereafter (this third highest speed ratio is, for example, the THIRD speed ratio if the transmission has five forward drive speed ratios, or the SECOND speed ratio if the transmission has four forward drive speed ratios). Alternatively, the shift control system may be arranged such that when the shift lever is shifted from the second automatic shift control position to the manual shift control position, the transmission is shifted to a speed ratio lower than the speed ratio that has been in effect prior to this shifting of the shift lever, and this newly set speed ratio is maintained as long as the shift lever is not operated thereafter.

With this arrangement, while the vehicle is traveling at the highest speed ratio, only by shifting the shift lever from the first automatic shift control position through the second automatic shift control position to the manual shift control position, the transmission can be downshifted in steps, one step from the highest speed ratio to the second highest speed ratio and then another one step from the second highest speed ratio to the third highest speed ratio.

In another embodiment of shift control system according to the present invention, the automatic shift control for the second automatic shift control position is executed in accordance with speed ratio shift lines which are mapped more toward higher speeds than those mapped for the automatic shift control of the first automatic shift control position. When the shift lever is shifted along the connection shift guide path from the second automatic shift control position to the manual shift control position, the transmission is downshifted to a speed ratio lower than the speed ratio that has been in effect. Then, every time the shift lever at the manual shift control position is swiveled along the second shift guide path, the transmission is shifted by one step to a new speed ratio in the forward drive speed ratios.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2000-062562 filed on Mar. 7, 2000, which is incorporated herein by reference.

What is claimed is:

1. A shift control system for a vehicular automatic transmission, comprising:
    a first shift guide path which guides a shift lever manipulated by a driver between a first automatic shift control position and a second automatic shift control position;
    a connection shift guide path which extends in a direction different from that of said first shift guide path and guides said shift lever from said second automatic shift control position to a manual shift control position; and
    a second shift guide path which guides said shift lever positioned at said manual shift control position into a direction different from that of said connection shift guide path;
    wherein:
        when said shift lever is shifted in said connection shift guide path from said second automatic shift control position to said manual shift control position, said transmission is shifted to a speed ratio lower than a speed ratio that has been in effect prior to this shifting of said shift lever; and
        every time said shift lever at said manual shift control position is swiveled in said second shift guide path, said transmission is shifted to a speed ratio next in order in a sequentially arranged forward drive speed ratios.

2. The shift control system as set forth in claim 1, wherein:
    said first shift guide path, said connection shift guide path and said second shift guide path are provided as an opening in a shift box;
    said shift lever having a knob at a top is provided pivotally in said shift box, said shift lever extending out of said shift box through said shift guide paths; and
    said knob is gripped by the driver to shift said shift lever along said first shift guide path, said connection shift guide path and said second shift guide path.

3. The shift control system as set forth in claim 1, wherein:
    said first shift guide path is a linear opening which extends forward and rearward;
    said connection shift guide path is an opening which extends from one end of said first shift guide path, laterally rightward or leftward, perpendicularly to said first shift guide path; and
    said second shift guide path is an opening which is continuous from an end of said connection shift guide path and extends forward and rearward.

4. The shift control system as set forth in any of claims 1, 2 and 3, wherein:
    a parking position, a reverse drive position, a neutral position, said first automatic shift control position and said second automatic shift control position are provided in this order along said first shift guide path.

5. The shift control system as set forth in any of claims 1, 2 and 3, wherein:
    said shift lever at said manual shift control position in said second shift guide path can be swiveled onto a "up" side and a "down" side, which are located forward and rearward, respectively;
    every time said shift lever at said manual shift control position is swiveled to said "up" side, said transmission is upshifted by one step to a speed ratio next in order; but
    every time said shift lever at said manual shift control position is swiveled to said "down" side, said transmission is downshifted by one step to a speed ratio next in order.

6. The shift control system as set forth in claim 1, wherein:
    when said shift lever is set at said first automatic shift control position, said transmission is controlled in an automatic shift control which is executed with forward drive speed ratios up to a highest speed ratio; and
    when said shift lever is set at said second automatic shift control position, said transmission is controlled in an automatic shift control with forward drive speed ratios up to a second highest speed ratio which is lower than said highest speed ratio.

7. The shift control system as set forth in claim 6, wherein:
    said second highest speed ratio is a speed ratio which is one step lower than said highest speed.

8. The shift control system as set forth in claim 6 or 7, wherein:
    when said shift lever is shifted from said second automatic shift control position to said manual shift control position, said transmission is shifted to a speed ratio which is lower than a speed ratio that has been in effect prior to this shifting of said shift lever; and
    thereafter, as long as said shift lever is not operated, said transmission is controlled in an automatic shift control with forward drive speed ratios up to a third highest speed ratio which is one step lower than said second highest speed ratio.

9. The shift control system as set forth in claim 6 or 7, wherein:
    when said shift lever is shifted from said second automatic shift control position to said manual shift control position, said transmission is shifted to a speed ratio which is lower than a speed ratio that has been in effect prior to this shifting of said shift lever; and
    thereafter, said transmission is kept at this newly set speed ratio as long as said shift lever is not operated.

10. The shift control system as set forth in claim 1, wherein:
    when said shift lever is either at said first automatic shift control position or at said second automatic shift control position, said transmission is controlled in an automatic shift control which is executed with forward drive speed ratios up to a highest speed ratio; but the automatic shift control for said second automatic shift control position is executed in accordance with speed ratio shift lines which are mapped more toward higher speeds than those mapped for the automatic shift control of said first automatic shift control position.

11. The shift control system as set forth in claim 10, wherein:

when said shift lever is shifted from said second automatic shift control position to said manual shift control position, said transmission is shifted to a speed ratio which is lower than a speed ratio that has been in effect prior to this shifting of said shift lever; and thereafter, as long as said shift lever is not operated, said transmission is operated in an automatic shift control which is executed in accordance with an automatic shift control map predetermined for a sporty driving, applying forward drive speed ratios up to a third highest speed ratio, which is one step lower than a second highest speed ratio.

12. The shift control system as set forth in claim 10, wherein:

when said shift lever is shifted from said second automatic shift control position to said manual shift control position, said transmission is shifted to a speed ratio which is lower than a speed ratio that has been in effect prior to this shifting of said shift lever; and thereafter, said transmission is kept at this newly set speed ratio as long as said shift lever is not operated.

* * * * *